US 11,876,750 B2

(12) United States Patent
Oh et al.

(10) Patent No.: US 11,876,750 B2
(45) Date of Patent: *Jan. 16, 2024

(54) METHOD AND APPARATUS FOR DETERMINING CHANNEL ACCESS PROCEDURE IN WIRELESS COMMUNICATION SYSTEM

(71) Applicant: Samsung Electronics Co., Ltd., Suwon-si (KR)

(72) Inventors: Jinyoung Oh, Suwon-si (KR); Jonghyun Bang, Suwon-si (KR); Jeongho Yeo, Suwon-si (KR); Hyunseok Ryu, Suwon-si (KR); Sungjin Park, Suwon-si (KR); Cheolkyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/190,613

(22) Filed: Mar. 27, 2023

(65) Prior Publication Data

US 2023/0239117 A1    Jul. 27, 2023

Related U.S. Application Data

(63) Continuation of application No. 16/861,948, filed on Apr. 29, 2020, now Pat. No. 11,616,623.

(30) Foreign Application Priority Data

May 2, 2019   (KR) .................. 10-2019-0051426

(51) Int. Cl.
*H04L 5/00* (2006.01)
*H04W 72/1268* (2023.01)
(Continued)

(52) U.S. Cl.
CPC ....... *H04L 5/0053* (2013.01); *H04W 72/1268* (2013.01); *H04W 72/21* (2023.01); *H04W 72/23* (2023.01)

(58) Field of Classification Search
CPC ........... H04L 5/0053; H04W 72/0413; H04W 72/042; H04W 72/1268
See application file for complete search history.

(56) References Cited

U.S. PATENT DOCUMENTS 10,194,439 B2 *  1/2019  Dinan ................ H04W 72/12
10,499,382 B2 * 12/2019  Dinan ................ H04L 5/0053
(Continued)

FOREIGN PATENT DOCUMENTS

CN    109196944 A    1/2019
CN    110463333 A    11/2019
(Continued)

OTHER PUBLICATIONS

3rd Generation Partnership Project; Technical Specification Group Radio Access Network; Physical layer procedures for shared spectrum channel access (Release 15), 3GPP TS 37.213 V15.2.0, Mar. 27, 2019.

(Continued)

*Primary Examiner* — Eric Nowlin
(74) *Attorney, Agent, or Firm* — Jefferson IP Law, LLP

(57) ABSTRACT

A communication technique for convergence between a 5th-Generation (5G) communication system for supporting higher data rates beyond a 4th-Generation (4G) system and a technology for Internet of Things (IoT), and a system thereof, are provided. The communication technique and system may be applied to intelligent services (for example, smart homes, smart buildings, smart cities, smart cars or connected cars, health care, digital education, retail businesses, security and safety related services, etc.) based on (Continued)

the 5G communication technology and the IoT-related technology. A method and apparatus for determining a channel access procedure in a wireless communication system are provided.

20 Claims, 16 Drawing Sheets

(51) Int. Cl.
*H04W 72/21* (2023.01)
*H04W 72/23* (2023.01)

(56) References Cited

U.S. PATENT DOCUMENTS

| | | | | |
|---|---|---|---|---|
| 10,581,577 | B2* | 3/2020 | Li | H04L 5/0055 |
| 10,582,532 | B2* | 3/2020 | Larsson | H04W 74/0808 |
| 10,582,536 | B2 | 3/2020 | Dinan | |
| 10,645,696 | B2* | 5/2020 | Dinan | H04L 27/0006 |
| 10,666,488 | B2* | 5/2020 | Mukherjee | H04W 72/0446 |
| 10,708,764 | B2 | 7/2020 | Hayashi et al. | |
| 10,721,762 | B2 | 7/2020 | Amuru et al. | |
| 10,764,913 | B2* | 9/2020 | Yerramalli | H04W 72/1268 |
| 10,873,962 | B2 | 12/2020 | Jeon et al. | |
| 10,880,922 | B2 | 12/2020 | Koorapaty et al. | |
| 10,904,915 | B2* | 1/2021 | Yoshimura | H04L 5/0053 |
| 11,083,017 | B2 | 8/2021 | Koorapaty et al. | |
| 11,229,025 | B2* | 1/2022 | Lunttila | H04W 72/21 |
| 11,234,271 | B2* | 1/2022 | Zhou | H04L 5/0053 |
| 11,470,640 | B2* | 10/2022 | Li | H04W 72/1268 |
| 11,546,121 | B2* | 1/2023 | Kim | H04L 5/0098 |
| 2017/0099667 | A1* | 4/2017 | Dinan | H04W 74/04 |
| 2017/0099678 | A1 | 4/2017 | Dinan | |
| 2017/0111888 | A1* | 4/2017 | Dinan | H04W 72/23 |
| 2017/0222749 | A1 | 8/2017 | Dinan | |
| 2017/0238233 | A1 | 8/2017 | Oh et al. | |
| 2017/0280475 | A1* | 9/2017 | Yerramalli | H04W 72/56 |
| 2017/0359808 | A1 | 12/2017 | Dinan | |
| 2018/0191547 | A1* | 7/2018 | Mukherjee | H04W 72/0446 |
| 2018/0199369 | A1* | 7/2018 | Larsson | H04W 72/23 |
| 2018/0302795 | A1 | 10/2018 | Harada et al. | |
| 2018/0317256 | A1 | 11/2018 | Um et al. | |
| 2018/0367282 | A1* | 12/2018 | Li | H04W 72/1268 |
| 2018/0368142 | A1 | 12/2018 | Liou | |
| 2019/0014598 | A1* | 1/2019 | Yoshimura | H04W 16/14 |
| 2019/0075592 | A1 | 3/2019 | Li et al. | |
| 2019/0090126 | A1 | 3/2019 | Hayashi et al. | |
| 2019/0159253 | A1 | 5/2019 | Koorapaty et al. | |
| 2019/0174546 | A1 | 6/2019 | Jeon et al. | |
| 2019/0208524 | A1* | 7/2019 | Dinan | H04L 27/0006 |
| 2019/0394792 | A1 | 12/2019 | Jeon et al. | |
| 2019/0394798 | A1* | 12/2019 | Tomeba | H04W 74/02 |
| 2020/0008241 | A1* | 1/2020 | Zhou | H04W 72/0446 |
| 2020/0205195 | A1 | 6/2020 | Sun et al. | |
| 2020/0236703 | A1 | 7/2020 | Amuru et al. | |
| 2020/0359411 | A1 | 11/2020 | Li et al. | |
| 2020/0383108 | A1* | 12/2020 | Lunttila | H04W 72/21 |
| 2021/0014894 | A1* | 1/2021 | Li | H04W 72/1273 |
| 2021/0051718 | A1* | 2/2021 | Bhattad | H04W 72/23 |
| 2021/0195639 | A1 | 6/2021 | Kim et al. | |
| 2021/0298045 | A1 | 9/2021 | Kim et al. | |
| 2021/0360699 | A1 | 11/2021 | Koorapaty et al. | |
| 2021/0392683 | A1 | 12/2021 | Awadin et al. | |
| 2021/0399934 | A1 | 12/2021 | Xia et al. | |
| 2022/0053523 | A1 | 2/2022 | Jia et al. | |
| 2022/0159712 | A1* | 5/2022 | Myung | H04L 5/0007 |

FOREIGN PATENT DOCUMENTS

| | | |
|---|---|---|
| CN | 112352464 A | 2/2021 |
| EP | 3 579 652 A1 | 12/2019 |
| EP | 3 459 314 B1 | 1/2021 |
| EP | 3 823 409 A1 | 5/2021 |
| EP | 3 944 704 A1 | 1/2022 |
| KR | 10-2020-0121383 A | 10/2020 |
| KR | 10-2168141 B1 | 10/2020 |
| KR | 10-2307242 B1 | 9/2021 |
| WO | 2017/199205 A1 | 11/2017 |
| WO | 2018/038777 A1 | 3/2018 |
| WO | 2018/062976 A1 | 4/2018 |
| WO | 2018/143339 A1 | 8/2018 |
| WO | 2018/165347 A1 | 9/2018 |
| WO | 2018/183436 A1 | 10/2018 |
| WO | 2019/027297 A1 | 2/2019 |
| WO | 2019/210185 A1 | 10/2019 |

OTHER PUBLICATIONS

3rd Generation Partnership Project; Technical Specification Group Radio Access Network; NR; Physical layer procedures for control (Release 15), 3GPP TS 38.213 V15.5.0, Mar. 27, 2019.
International Search Report dated Aug. 6, 2020, issued in International Application No. PCT/KR2020/005790.
Written Opinion dated Aug. 6, 2020, issued in International Application No. PCT/KR2020/005790.
Extended European Search Report dated Apr. 12, 2022, issued in a counterpart European Application No. 20798522.7.
Chinese Office Action dated Oct. 21, 2023, issued in Chinese Patent Application No. 202080029314.8.

* cited by examiner

METHOD AND APPARATUS FOR DETERMINING CHANNEL ACCESS PROCEDURE IN WIRELESS COMMUNICATION SYSTEM

CROSS-REFERENCE TO RELATED APPLICATION(S)

This application is a continuation application of prior application Ser. No. 16/861,948, filed on Apr. 29, 2020, which will be issued as U.S. Pat. No. 11,616,623 on Mar. 28, 2023 and is based on and claims priority under 35 U.S.C § 119(a) of a Korean patent application number 10-2019-0051426, filed on May 2, 2019, in the Korean Intellectual Property Office, the disclosure of which is incorporated by reference herein in its entirety.

BACKGROUND

1. Field

The disclosure relates to a wireless communication system. More particularly, the disclosure relates to a method and apparatus for determining a channel access procedure performed when a terminal transmits an uplink signal in a wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "Beyond 4G Network Communication System" or a "Post long term evolution (LTE) System". A 5G communication system defined in a 3rd generation partnership project (3GPP) is referred to a new radio (NR) system.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), an array antenna, analog beamforming, and large-scale antenna techniques have been discussed and adopted in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving networks, cooperative communication, Coordinated Multi-Points (CoMPs), reception-end interference cancellation, and the like.

In the 5G system, Hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), sparse code multiple access (SCMA), and the like as an advanced access technology have been developed.

The Internet, which is a human centered connectivity network where humans generate and consume information, is now evolving to the Internet of Things (IoT) network where distributed entities, such as things, exchange and process information. The Internet of Everything (IoE), which is a combination of the IoT technology and the Big Data processing technology through connection with a cloud server and the like, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched for the connection between things. Such an IoT environment may provide intelligent Internet technology (IT) services that create a new value to human life by collecting and analyzing data generated among connected things. The IoT may be applied to a variety of fields including smart homes, smart buildings, smart cities, smart cars or connected cars, smart grids, health care, smart appliances and advanced medical services through convergence and combination between existing Information Technology (IT) and various industrial applications.

In line with this, various attempts have been made to apply 5G communication systems to IoT networks. For example, 5G communication such as a sensor network, Machine-to-Machine (M2M) communication, and Machine Type Communication (MTC) may be implemented by techniques such as beamforming, MIMO, and array antennas. Application of a cloud Radio Access Network (RAN) as the above-described Big Data processing technology may also be considered to be as an example of convergence between the 5G technology and the IoT technology.

Recently, since research on communication using an unlicensed band in a wireless communication system has been increased, improvement on a channel access procedure is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for determining a channel access procedure in a wireless communication system.

Additional aspects will be set forth in part in the description which follows and, in part, will be apparent from the description, or may be learned by practice of the presented embodiments.

In accordance with an aspect of the disclosure, a method performed by a terminal is provided. The method includes receiving, from a base station, downlink control information (DCI) including information indicating a combination of a channel access type and an index for identifying a starting position of an uplink signal, performing a channel access procedure based on the channel access type identified by the information, and transmitting, to the base station, the uplink signal based on the index identified by the information.

In accordance with another aspect of the disclosure, a method performed by a base station is provided. The method includes transmitting, to a terminal, downlink control information (DCI) including information indicating a combination of a channel access type and an index for identifying a starting position of an uplink signal, and receiving, from the terminal, the uplink signal based on the index identified by the information, the uplink signal being received based on a channel access procedure performed based on the channel access type identified by the information.

In accordance with another aspect of the disclosure, a terminal is provided. The terminal includes a transceiver configured to transmit and receive a signal, and a controller operatively couple to the transceiver and configured to receive, from a base station, downlink control information (DCI) including information indicating a combination of a channel access type and an index for identifying a starting position of an uplink signal, perform a channel access procedure based on the channel access type identified by the information, and transmit, to the base station, the uplink signal based on the index identified by the information.

In accordance with another aspect of the disclosure, a base station is provided. The base station includes a transceiver configured to transmit and receive a signal, and a controller operatively couple to the transceiver and configured to transmit, to a terminal, downlink control information (DCI) including information indicating a combination of a channel access type and an index for identifying a starting position of an uplink signal, and receive, from the terminal, the uplink signal based on the index identified by the information, the uplink signal being received based on a channel access procedure performed based on the channel access type identified by the information.

Various embodiments provide a method by which a terminal correctly determines a channel access procedure performed in order to transmit an uplink signal or channel via an unlicensed band, and thus can more effectively perform communication with a base station.

Effects obtainable from the disclosure may not be limited to the above mentioned effects, and other effects which are not mentioned may be clearly understood, through the following descriptions, by those skilled in the art to which the disclosure pertains.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
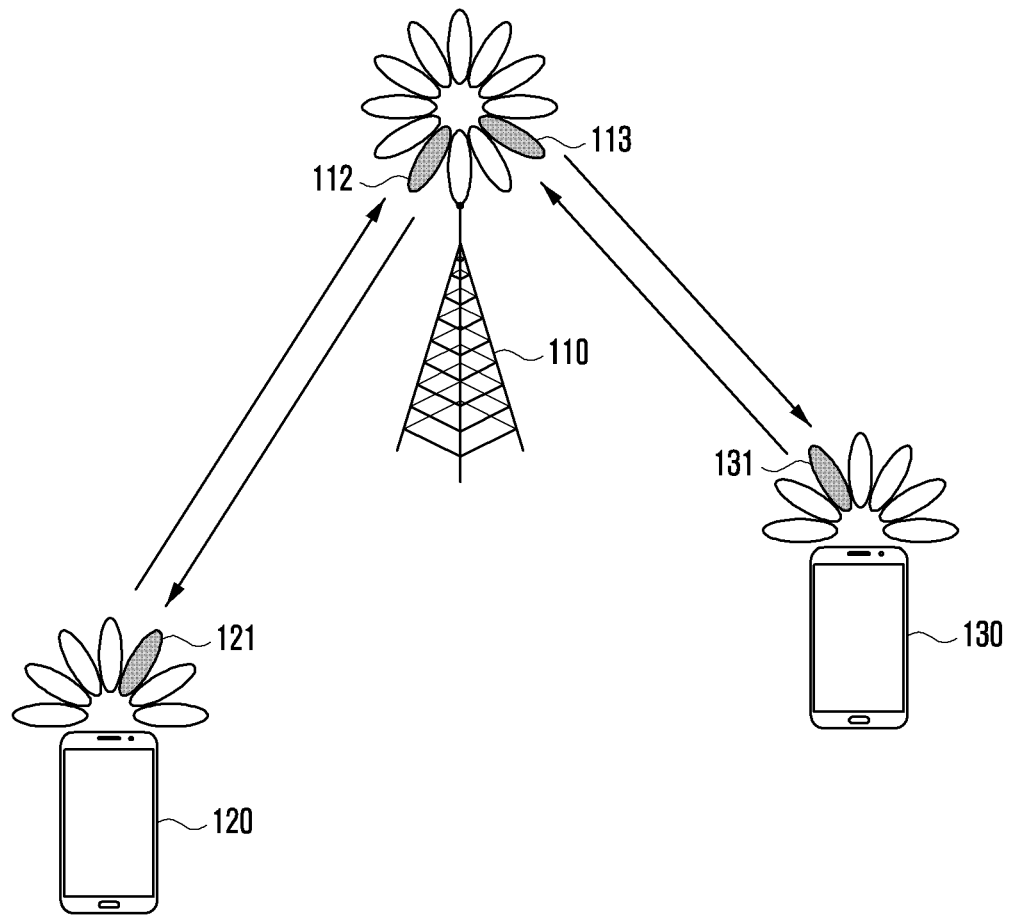
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a non-transitory computer usable or computer-readable memory that can direct a computer or other programmable data processing apparatus to function in a particular manner, such that the instructions stored in the non-transitory computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card. Further, the "unit" in the embodiments may include one or more processors.

Wireless communication systems have evolved into broadband wireless communication systems that provide high-speed, high-quality packet data services along with communication standards, such as high-speed packet access (HSPA) of 3GPP, long-term evolution (LTE) or evolved universal terrestrial radio access (E-UTRA), LTE-advanced (LTE-A), high rate packet data (HRPD) of 3GPP2, ultra-mobile broadband (UMB), and IEEE 802.16e, rather than providing voice-oriented services. In addition, a communication standard of 5G or new radio (NR) is being developed as a $5^{th}$ generation wireless communication system.

In the case of a 5G communication system, various technologies, such as a transmission technology (e.g., grant-free uplink transmission) capable of transmitting an uplink signal without code block group (CBG) unit retransmission and uplink scheduling information, in order to provide various services and support a high data rate will be introduced. Therefore, for the case where it is necessary to perform 5G communication via an unlicensed band, a more efficient channel access procedure in which various variables are taken into account is required.

As described above, at least one service among enhanced mobile broadband (eMBB), massive machine type communications (mMTC), and ultra-reliable and low-latency communications (URLLC) may be provided to a terminal in a wireless communication system including the $5^{th}$ generation. The above-described services may be provided to the same terminal during the same time period. In an embodiment, the eMBB, mMTC, and URLLC are services aiming for a high-speed transmission of high-capacity data, minimization of terminal power and access of multiple terminals, and high reliability and low latency, respectively, but are not limited thereto. The three services may be main scenarios in an LTE system or a system such as 5G/NR (new radio or next radio) after the LTE, but are not limited to the above examples. In addition, the above-described services of the 5G system are examples, and services available for the 5G system are not limited to the examples described above. Further, a system providing the URLLC service may be referred to as a URLLC system, and a system providing the eMBB service may be referred to as an eMBB system. Moreover, the terms "service" and "system" may be used interchangeably or used in combination.

Hereinafter, the base station, as a main entity that performs resource allocation for a terminal, may include at least one of an eNode B, a Node B, a base station (BS), a radio access unit, a base station controller, or a node on a network. The terminal may include at least one of a user equipment (UE), a mobile station (MS), a cellular phone, a smart phone, a computer, or a multimedia system capable of performing a communication function. In the disclosure, a "downlink (DL)" refers to a radio transmission path of a signal transmitted by a base station to a base station, and an "uplink (UL)" refers to a radio transmission path of a signal transmitted by a terminal to a base station.

Hereinafter, description will be given of an LTE or LTE-A system as an example in an embodiment, and the terms "physical channel" and a "signal" in a LTE or LTE-A system of the related art may be used to describe a method and apparatus proposed in the disclosure. An embodiment of the disclosure is applicable to other communication systems having a technical background or channel form similar to the mobile communication system described in the disclosure. For example, a 5G mobile communication technology (NR) developed after the LTE-A may be included in said other communication systems. In addition, an embodiment, which is determined by persons skilled in the art, is also be applicable to other communication systems through partial modification within a range not significantly departing from the scope of the disclosure.

The 5G system or the new radio (NR) system as a typical example of a broadband wireless communication system employs an orthogonal frequency division multiplexing (OFDM) scheme in downlink and employs both the OFDM scheme and a single carrier frequency division multiple access (SC-FDMA) or discrete Fourier transform (DFT) spread OFDM (DFT-s-OFDM) scheme in uplink. In the multiplex access scheme, time-frequency resources through which data or control information of each user is transmitted are allocated and operated such that the resources do not overlap each other, that is, the orthogonality is established therebetween, and thus the data or control information of each user can be identified.

The NR system employs a hybrid automatic repeat request (HARQ) scheme in which the corresponding data is retransmitted in a physical layer when a decoding failure occurs in an initial transmission. The HARQ scheme refers to a scheme by which a receiver transmits information (e.g., negative acknowledgment (NACK)) informing a transmitter of the decoding failure when the receiver fails to correctly decode data, so that the transmitter can retransmit the data in the physical layer. The receiver may enhance data reception performance by combining data retransmitted by the transmitter with data on which decoding has been failed. In addition, the HARQ scheme may allow the receiver to transmit information informing the transmitter of decoding success (e.g., acknowledgment (ACK)) when the receiver correctly decodes data, so that the transmitter can transmit new data.

The terms referring to a signal, a channel, control information, network entities, an element of a device, and the like are used in the description below for convenience of description. Therefore, the disclosure is not limited to the terms described below, and other terms having equivalent technical meanings may be used in the disclosure.

In addition, various embodiments are described using terms used in some communication standards (e.g., 3GPP), but the terms are only examples for explanation. Various embodiments may be easily modified and thus applied to other communication systems.

Various embodiments are described based on the NR system, but the descriptions in the disclosure are applicable to various wireless communication systems, such as LTE, LTE-A, LTE-A-Pro, and 5G, rather than being limited to the NR system. In addition, a system and apparatus for transmitting and receiving a signal using an unlicensed band are described in the disclosure, but the description of the disclosure is applicable to a system operating in a licensed band.

Hereinafter, in the disclosure, a higher layer signaling or higher layer signal may refer to a signal delivery method in which a signal is delivered from a base station to a terminal using a downlink data channel of a physical layer or delivered from a terminal to a base station using an uplink data channel of a physical layer. The higher layer signaling or higher layer signal may include at least one of delivery methods in which a signal is delivered via radio resource control (RRC) signaling, packet data convergence protocol (PDCP) signaling, or a media access control-control element (MACCE). In addition, the higher layer signaling or higher layer signal may include system information commonly transmitted to a plurality of terminals, for example, a system information block (SIB), and may also include information excluding a master information block (MIB) among information transmitted via a physical broadcast channel (PBCH). Here, the MIB may also be included in the higher layer signal.

FIG. 1 illustrates a wireless communication system according to an embodiment of the disclosure.

FIG. 1 illustrates a base station 110, a terminal 120, and a terminal 130, which are a part of nodes that use a radio channel in a wireless communication system. FIG. 1 illustrates only one base station, but another base station identical or similar to the base station 110 may be further provided in the wireless communication system.

The base station 110 is a network infrastructure that provides wireless access to the terminals 120 and 130. The base station 110 has coverage defined as a certain geographic region, based on a distance in which a signal can be transmitted. The base station 110 may be referred to as an "access point (AP)", an "eNodeB (eNB)", a "gNodeB (gNB)", a "$5^{th}$ generation node (5G node)", a "wireless point", or a "transmission/reception point (TRP)", in addition to the base station, or as other terms having a technical meaning equivalent thereto.

Each of the terminal 120 and the terminal 130 is a device used by a user, and performs communication with the base station 110 via a radio channel. In some cases, at least one of the terminal 120 and the terminal 130 may be operated without user's involvement. That is, at least one of the terminal 120 and the terminal 130 may be a device that performs machine type communication (MTC) and thus may not be carried by a user. Each of the terminal 120 and the terminal 130 may be referred to as a "user equipment (UE)", a "mobile station", a "subscriber station", a "remote terminal", a "wireless terminal", or a "user device", in addition to the terminal, or as other terms having a technical meaning equivalent thereto.

A wireless communication environment between the base station 110 and the terminals 120 and 130 may include wireless communication in an unlicensed band. The base station 110, the terminal 120, and the terminal 130 may transmit and receive a radio signal in an unlicensed band (e.g., 5 to 7 GHz, and 64 to 71 GHz). A cellular communication system and another communication system (e.g., a wireless local area network (WLAN)) may coexist in the unlicensed band. The base station 110, the terminal 120, and the terminal 130 may perform a channel access procedure for the unlicensed band in order to ensure fairness between two communication systems, in other words, to prevent a situation in which a channel is exclusively used by one system. As an example of the channel access procedure for an unlicensed band, the base station 110, the terminal 120, and the terminal 130 may perform listen before talk (LBT).

The base station 110, the terminal 120, and the terminal 130 may transmit and receive a radio signal in a millimeter wave (mmWave) band (e.g., 28 GHz, 30 GHz, 38 GHz, and 60 GHz). Here, the base station 110, the terminal 120, and the terminal 130 may perform beamforming in order to improve a channel gain, (e.g., 112, 113, 121, and 131). In this regard, the beamforming may include transmitting beamforming and receiving beamforming That is, the base station 110, the terminal 120, the terminal 130 may provide directivity to a transmission signal or a reception signal. To this end, the base station 110 and the terminals 120 and 130 may select serving beams through a beam search or beam management procedure. After the serving beams are selected, subsequent communication may be performed through a resource having a quasi co-location (QCL) relationship with a resource that has transmitted the serving beams.

Figure 2:
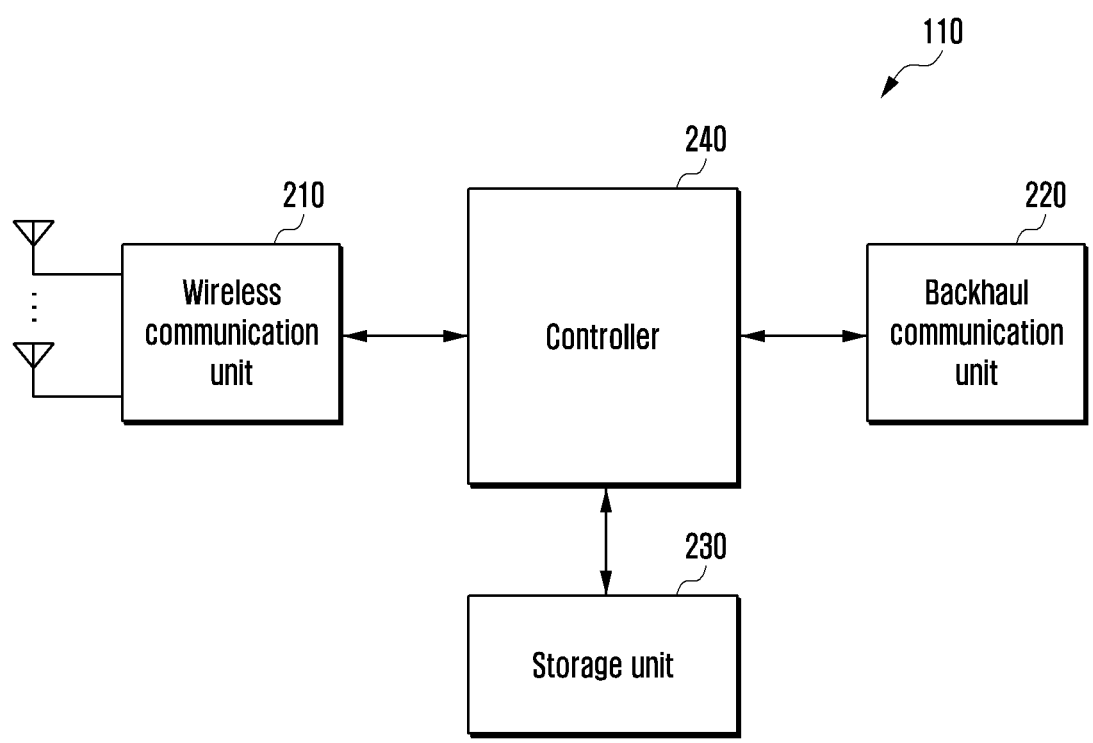
FIG. 2 illustrates a configuration of a base station in a wireless communication system according to an embodiment of the disclosure.

FIG. 2 illustrates a configuration of a base station in a wireless communication system according to an embodiment of the disclosure.

The configuration illustrated in FIG. 2 may be understood as a configuration of the base station 110. Terms, such as "unit", and "-or/er", described below indicate a unit for processing at least one function or operation, which may be implemented by hardware, software, or a combination thereof.

Referring to FIG. 2, the base station 110 includes a wireless communication unit 210, a backhaul communication unit 220, a storage unit 230, and a controller 240.

The wireless communication unit 210 performs functions for transmitting and receiving a signal via a wireless channel. For example, the wireless communication unit 210 performs a function of conversion between a baseband signal and a bit-stream according to the physical layer standard of the system. For example, the wireless communication unit 210 generates complex symbols during data transmission by encoding and modulating a transmission bitstream. In addition, the wireless communication unit 210 restores, when receiving data, a reception bitstream through demodulation and decoding of the baseband signal.

In addition, the wireless communication unit 210 up-converts a baseband signal into a radio frequency (RF) band signal and then transmits the signal via an antenna, and down-converts the RF band signal received via the antenna into a baseband signal. To this end, the wireless communication unit 210 may include a transmission filter, a reception filter, an amplifier, a mixer, an oscillator, a digital to analog convertor (DAC), and an analog to digital converter (ADC), and the like. In addition, the wireless communication unit 210 may include a plurality of transmission/reception paths. Furthermore, the wireless communication unit 210 may include at least one antenna array configured by a plurality of antenna elements.

With regard to hardware, the wireless communication unit 210 may be configured by a digital unit and an analog unit, and the analog unit may be configured by a plurality of sub-units according to operating power, operating frequency, and the like. The digital unit may be implemented as at least one processor (e.g., digital signal processor (DSP)).

The wireless communication unit 210 transmits and receives a signal as described above. Accordingly, all or part of the wireless communication unit 210 may be referred to as a "transmitter", a "receiver", or a "transceiver". In addition, transmission and reception performed via a wireless channel are used in the following description as a meaning of including a process performed by the wireless communication unit 210, as described above. According to an embodiment, the wireless communication unit 210 may include at least one transceiver.

The backhaul communication unit 220 provides an interface for performing communication with other nodes in a network. That is, the backhaul communication unit 220 converts a bitstream transmitted from a base station to another node, for example, another access node, another base station, an upper node, a core network, or the like, into a physical signal, and converts a physical signal received from another node into a bitstream.

The storage unit 230 stores data, such as a basic program, applications, and configuration information, for the operation of a base station. The storage unit 230 may configured as volatile memory, nonvolatile memory, or a combination of volatile memory and nonvolatile memory. Further, the storage unit 230 provides the stored data at the request of the controller 240. According to an embodiment, the storage unit 230 may include memory.

The controller 240 controls the overall operations of a base station. For example, the controller 240 transmits and receives a signal via the wireless communication unit 210 or the backhaul communication unit 220. In addition, the controller 240 records data in the storage unit 230 and reads the data. Further, the controller 240 may perform the functions of a protocol stack required by a communication standard. According to another embodiment, the protocol stack may be included in the wireless communication unit 210. According to an embodiment, the controller 240 may include at least one processor.

According to various embodiments, the controller 240 may control such that a base station performs operations according to various embodiments described below. For example, the control unit 240 may perform a channel access procedure for an unlicensed band. For example, the transceiver (e.g., the wireless communication unit 210) receives signals transmitted via the unlicensed band, and the controller 240 may determine whether the unlicensed band is in an idle state, by comparing the intensity of the received signals or the like with a threshold value which is defined in advance or determined by a function value having a bandwidth or the like as a factor. For example, the controller 240 may transmit a control signal to a terminal via the transceiver or receive a control signal from the terminal. Further, the controller 240 may transmit data to the terminal via the transceiver or receive data from the terminal. The controller 240 may determine a transmission result for a signal transmitted to the terminal, based on a control signal or data signal received from the terminal. For example, the controller 240 may maintain or change the contention window value for the channel access procedure, based on the transmission result, that is, based on the reception result of the terminal for a control signal or a data signal (hereinafter, contention window adjustment). According to various embodiments, the controller 240 may determine a reference slot in order to obtain a transmission result for contention window adjustment. The controller 240 may determine a data channel for contention window adjustment in the reference slot. The controller 240 may determine a reference control channel for contention window adjustment in the reference slot. The controller 240 may occupy the channel when the unlicensed band is determined as in an idle state.

Figure 3:
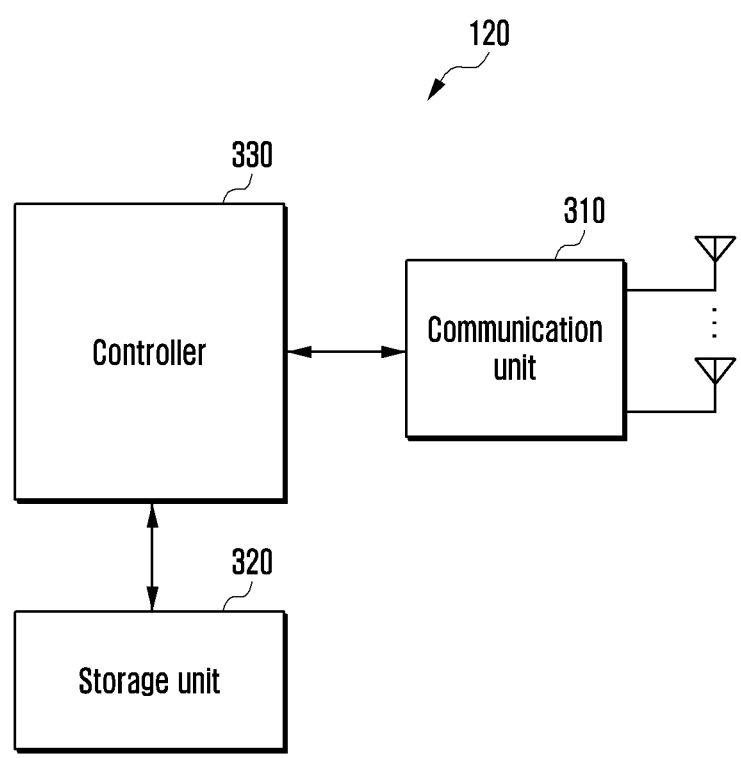
FIG. 3 illustrates a configuration of a terminal in a wireless communication system according to an embodiment of the disclosure.

FIG. 3 illustrates a configuration of a terminal in a wireless communication system according to an embodiment of the disclosure.

The configuration illustrated in FIG. 3 may be understood as a configuration of the terminal 120. Terms, such as "unit" and "-or/er", described below indicates a unit that processes at least one function or operation, which may be implemented by hardware, software, or a combination thereof.

Referring to FIG. 3, the terminal 120 includes a communication unit 310, a storage unit 320, and a controller 330.

The communication unit 310 performs functions for transmitting and receiving a signal via a wireless channel. For example, the communication unit 310 performs a function of conversion between a baseband signal and a bitstream according to the physical-layer standard of a system. For example, the communication unit 310 generates complex symbols during data transmission by encoding and modulating a transmission bitstream. In addition, the communication unit 310 restores, when receiving data, a reception bitstream through demodulation and decoding of the baseband signal. In addition, the communication unit 310 up-converts a baseband signal into an RF band signal and then transmits the signal via an antenna, and down-converts the RF band signal received via the antenna into a baseband signal. For example, the communication unit 310 may include a transmission filter, a reception filter, an amplifier, a mixer, an oscillator, a DAC, and an ADC.

In addition, the communication unit 310 may include a plurality of transmission/reception paths. Further, the communication unit 310 may include at least one antenna array configured by a plurality of antenna elements. In terms of hardware, the communication unit 310 may be configured as a digital circuit and an analog circuit (e.g., a radio frequency integrated circuit (RFIC)). In this regard, the digital circuit and the analog circuit may be implemented as a single package. In addition, the communication unit 310 may include a plurality of RF chains. Moreover, the communication unit 310 may perform beamforming.

The communication unit 310 transmits and receives a signal as described above. Accordingly, all or part of the communication unit 310 may be referred to as a "transmitter", a "receiver", or a "transceiver". In addition, transmission and reception performed via a wireless channel are used in the following description as a meaning of including a process performed by the communication unit 310, as described above. According to an embodiment, the communication unit 310 may include at least one transceiver.

The storage unit 320 stores data, such as a basic program, applications, and configuration information, for the operation of a terminal. The storage unit 320 may be configured as volatile memory, nonvolatile memory, or a combination of volatile memory and nonvolatile memory. Further, the storage unit 320 provides the stored data at the request of the controller 330. According to an embodiment, the storage unit 320 may include memory.

The controller 330 controls the overall operations of a terminal. For example, the controller 330 transmits and receives a signal via the communication unit 310. In addition, the controller 330 records data in the storage unit 320 and reads the data. Further, the controller 330 may perform the functions of a protocol stack required by a communication standard. To this end, the controller 330 may include at least one processor or microprocessor or may be a part of the processor. According to an embodiment, the controller 330 may include at least one processor. According to an embodiment, a part of the communication unit 310 and/or the controller 330 may be referred to as a communication processor (CP).

According to various embodiments, the controller 330 may control such that a terminal performs operations according to various embodiments described below. For example, the controller 330 may receive a downlink signal (a downlink control signal or downlink data) transmitted by the base station via the transceiver (e.g., the communication unit 310). For example, the controller 330 may determine a transmission result for the downlink signal. The transmission result may include information of the transmitted downlink signal on feedback for ACK, NACK, discontinuous transmission (DTX), etc. In the disclosure, the transmission result may be referred to as various terms, such as a reception status of a downlink signal, a reception result, a decoding result, and HARQ-ACK information. For example, the controller 330 may transmit an uplink signal as a response signal to a downlink signal to a base station via the transceiver. The uplink signal may include a transmission result for the downlink signal explicitly or implicitly.

The controller 330 may perform a channel access procedure for an unlicensed band. For example, the transceiver (e.g., the wireless communication unit 310) receives a signal transmitted via an unlicensed band, and the controller 330 may determine whether the unlicensed band is an idle state, by comparing the intensity of the received signal or the like with a threshold value which is defined in advance or determined by a function value including a bandwidth or the like as a factor. The controller 330 may perform an access procedure for an unlicensed band to transmit a signal to the base station.

Figure 4:
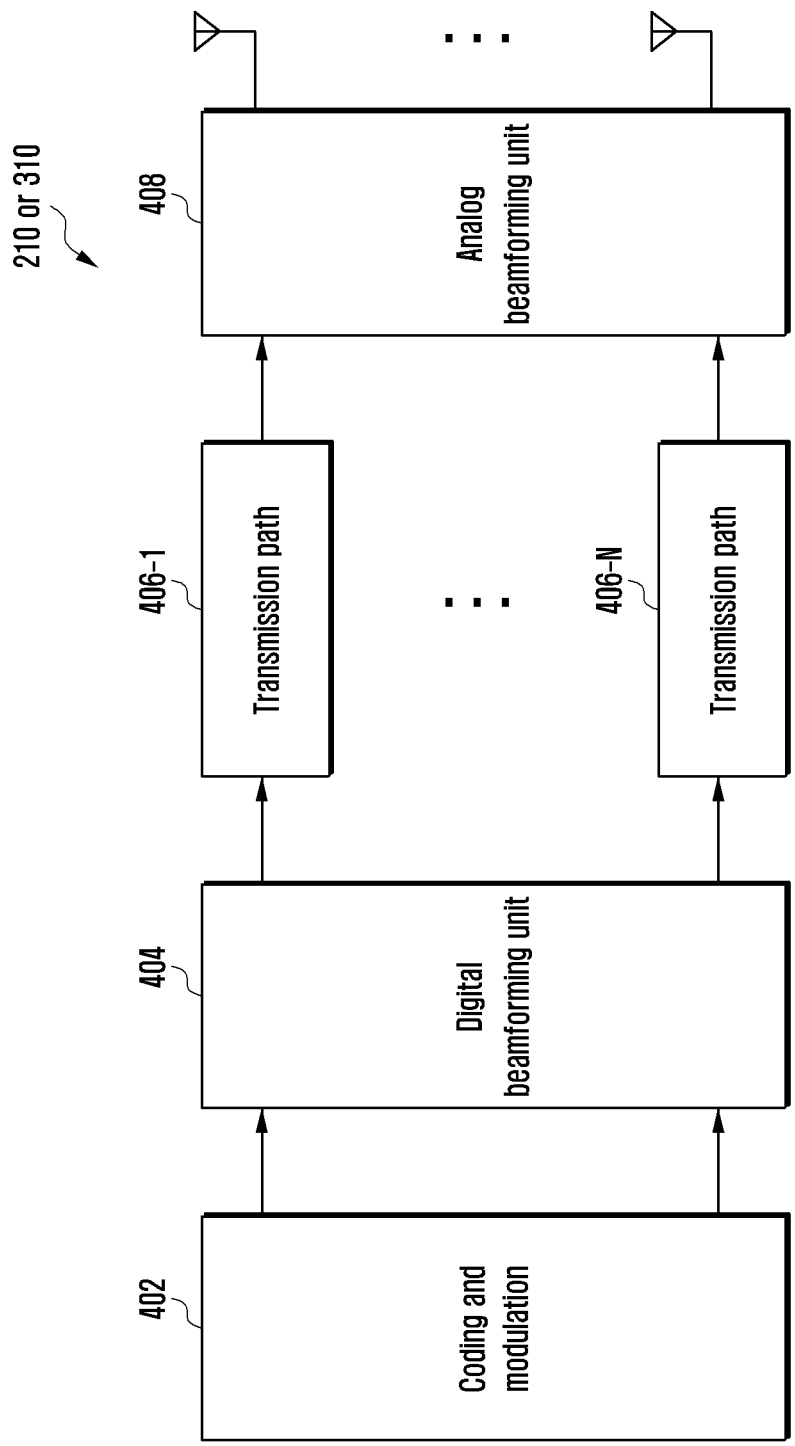
FIG. 4 illustrates a configuration of a communication unit in a wireless communication system according to an embodiment of the disclosure.

FIG. 4 illustrates a configuration of a communication unit in a wireless communication system according to an embodiment of the disclosure.

FIG. 4 illustrates an example of a detailed configuration of the wireless communication unit 210 in FIG. 2 or the communication unit 310 in FIG. 3. Specifically, FIG. 4 shows illustrates elements for performing beamforming, which are a part of the wireless communication unit 210 in FIG. 2 or the communication unit 310 in FIG. 3.

Referring to FIG. 4, the wireless communication unit 210 or the communication unit 310 includes an encoding and modulation unit 402, a digital beamforming unit 404, multiple transmission paths 406-1 to 406-N, and an analog beamforming unit 408.

The encoding and modulation unit 402 performs channel encoding. At least one of a low density parity check (LDPC) code, a convolution code, and a polar code may be used for the channel encoding. The encoding and modulation unit 402 generates modulation symbols by performing constellation mapping.

The digital beamforming unit 404 performs beamforming on a digital signal (e.g., modulation symbols). To this end, the digital beamforming unit 404 multiplies the modulation symbols by beamforming weights. Here, the beamforming weights are used to change the size and phase of a signal and may be referred to as a "precoding matrix", a "precoder", or the like. The digital beamforming unit 404 outputs digital-beamformed modulation symbols to the multiple transmission paths 406-1 to 406-N. Here, according to a multiple input multiple output (MIMO) transmission technique, the modulation symbols may be multiplexed, or the same modulation symbols may be provided to multiple transmission paths 406-1 to 406-N.

The multiple transmission paths 406-1 to 406-N convert digital-beamformed digital signals into analog signals. To this end, each of the multiple transmission paths 406-1 to 406-N may include an inverse fast Fourier transform (IFFT) operator, a cyclic prefix (CP) inserter, a DAC, and an up-converter. The CP inserter is for an OFDM scheme and thus may be excluded when another physical layer scheme (e.g., a filter bank multi-carrier (FBMC)) is applied. That is, the multiple transmission paths 406-1 to 406-N provide independent signal processing processes to multiple streams generated through digital beamforming. However, a part of elements of the multiple transmission paths 406-1 to 406-N may be shared according to an implementation method.

The analog beamforming unit 408 performs beamforming on an analog signal. To this end, the analog beamforming unit 408 multiplies analog signals by beamforming weights. Here, the beamforming weights are used to change the magnitude and phase of the signal. Specifically, the analog beamforming unit 408 may be variously configured according to a connection structure between the multiple transmission paths 406-1 to 406-N and antennas. For example, each of the multiple transmission paths 406-1 to 406-N may be connected to one antenna array. As another example, the multiple transmission paths 406-1 to 406-N may be connected to one antenna array. As still another example, the multiple transmission paths 406-1 to 406-N may be adaptively connected to one antenna array or two or more antenna arrays.

In the 5G system, a frame structure needs to be flexibly defined in consideration of various services and requirements. For example, each service may have a different subcarrier spacing (SCS) according to requirements. The current 5G communication system supports a plurality of subcarrier spacings, and the subcarrier spacing may be determined by Equation 1, $$\Delta f = f_0 * 2^m \qquad \text{Equation 1}$$

wherein f0 denotes the basic subcarrier spacing of a system, m denotes the scaling factor of the integer, and Δf denotes the subcarrier spacing. For example, if f0 is 15 kHz, the subcarrier spacing set that may be occupied by the 5G communication system may be configured as one of 3.75 kHz, 7.5 kHz, 15 kHz, 30 kHz, 60 kHz, 120 kHz, 240 kHz, and 480 kHz. An available subcarrier spacing set may be different according to a frequency band. For example, at least one of subcarrier spacings of 3.75 kHz, 7.5 kHz, 15 kHz, 30 kHz, and 60 kHz may be used in a frequency band of 7 GHz or lower, and at least one of subcarrier spacings of 60 kHz, 120 kHz, and 240 kHz or higher may be used in a frequency band of 7 GHz or higher.

In various embodiments, according to the subcarrier spacing constituting an OFDM symbol, the length of the corresponding OFDM symbol may be different. This is because of the OFDM symbol characteristic in which a subcarrier spacing and the length of an OFDM symbol have an inverse relationship with each other. For example, if the subcarrier spacing is 2 times larger, the symbol length is shortened to ½, and conversely, if the subcarrier spacing is reduced to ½, the symbol length is 2 times longer.

Figure 5:
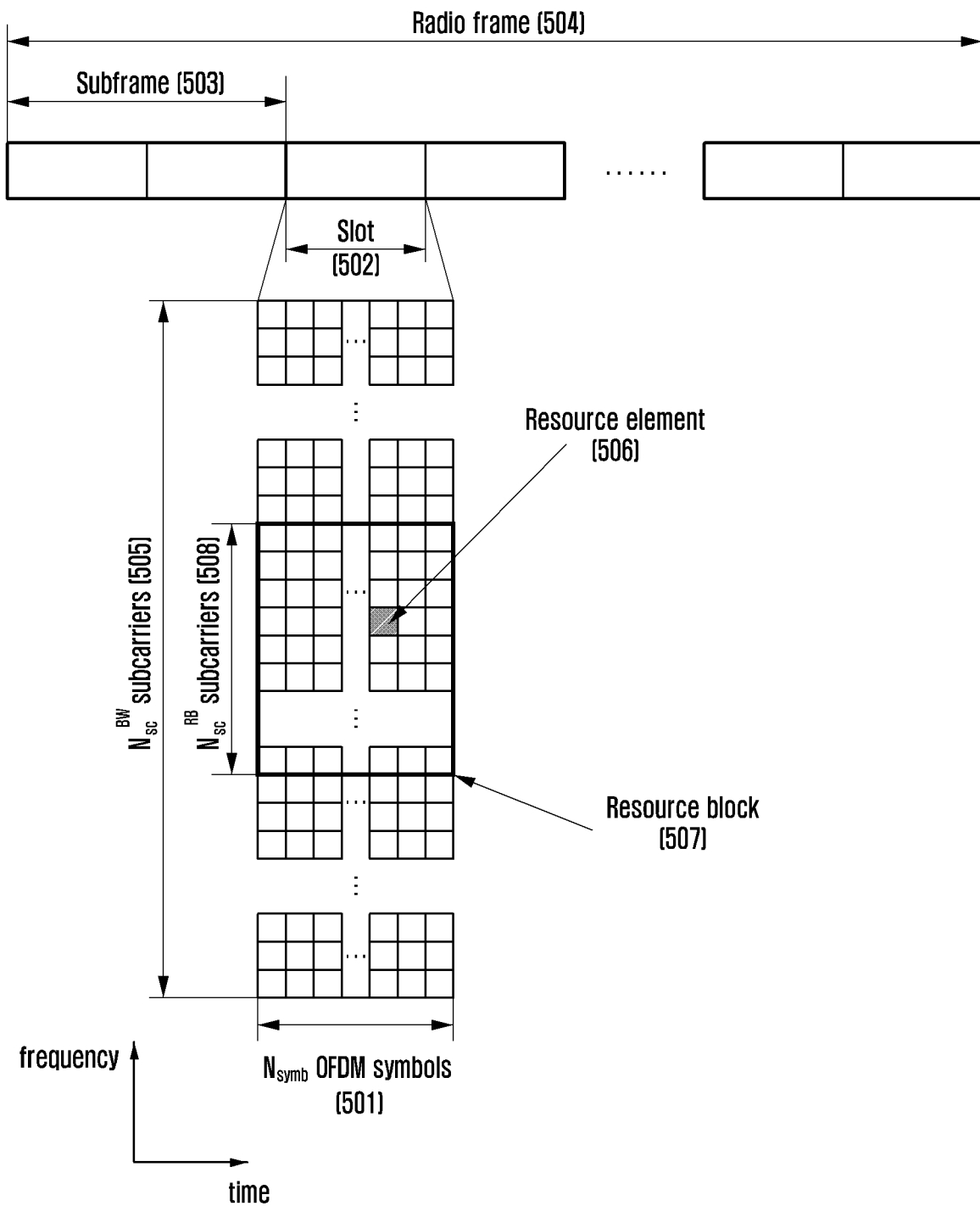
FIG. 5 illustrates an example of a radio resource region in a wireless communication system according to an embodiment of the disclosure.

FIG. 5 illustrates an example of a radio resource region in a wireless communication system according to an embodiment of the disclosure.

In various embodiments, the radio resource region may include a time-frequency domain structure. In various embodiments, the wireless communication system may include an NR communication system.

Referring to FIG. 5, a horizontal axis and a vertical axis in the radio resource region indicate a time domain and a frequency domain, respectively. The minimum transmission unit in the time domain may be an OFDM and/or DFT-s-OFDM symbol, and a single slot 502 may be configured by collecting N OFDM and/or DFT-s-OFDM symbols ($N_{symb}$) 501. In various embodiments, the OFDM symbol may include a symbol for the case where a signal is transmitted and received using an OFDM multiplexing scheme, and the DFT-s-OFDM symbol may include a symbol for the case where a signal is transmitted and received using a DFT-s-OFDM or SC-FDMA multiplexing scheme. Hereinafter, for convenience of description, an embodiment relating to an OFDM symbol will be discussed. The embodiment described below is also applicable to the DFT-s-OFDM symbol. In addition, the embodiment relating to downlink signal transmission and reception, discussed below for convenience of description, is also applicable to uplink signal transmission and reception.

Unlike that of FIG. 5, if a subcarrier spacing (SCS) is 15 kHz, one slot 502 constitutes one subframe 503, and each of the slot 502 and the subframe 503 may have the length of 1 ms. In various embodiments, the number of slots 502 constituting one subframe 503 and the length of the slot 502 may vary depending on the subcarrier spacing. For example, when a subcarrier spacing is 30 kHz, two slots may constitute one subframe 503. In this case, the length of the slot is 0.5 ms and the length of the subframe 503 is 1 ms. In addition, a radio frame 504 may be a time domain interval configured by 10 subframes. The minimum transmission unit in the frequency domain is a subcarrier, and a carrier bandwidth constituting a resource grid may be configured by a total of N subcarriers ($N_{sc}^{BW}$) 505.

However, the subcarrier spacing, the number of slots 502 included in the subframe 503, the length of the slot 502, and the length of the subframe 503 is variably applicable. For example, in the case of the LTE system, when a subcarrier spacing is 15 kHz, and two slots constitute one subframe 503, the length of the slot 502 may be 0.5 ms and the length of the subframe 503 may be 1 ms. For another example, in the case of the NR system, a subcarrier spacing (µ) may be one of 15 kHz, 30 kHz, 60 kHz, 120 kHz, and 240 kHz, and the number of slots included in one subframe according to the subcarrier spacing (µ) is 1, 2, 4, 8, and 16, respectively.

A basic unit of resources in the time-frequency domain may be a resource element (RE) 506, and the resource element 506 may be represented by an OFDM symbol index and a subcarrier index. A resource block 507 may include a plurality of resource elements. In the LTE system, a resource block (RB) (or physical resource block (PRB)) 507 may be defined by N continuous OFDM symbols ($N_{symb}$) 501 in the time domain and N continuous subcarriers ($N_{SC}^{RB}$) 508 in the frequency domain, respectively. The number of symbols ($N_{symb}$) and the number of subcarriers ($N_{SC}^{RB}$), which are included in one RB, may 14 and 12, respectively, the number of symbols ($N_{symb}$) and the number of subcarriers ($N_{SC}^{RB}$), which are included in one RB, may be 7 and 12, respectively, and the number of RB ($N_{RB}$) may vary according to the bandwidth of the system transmission band. In the NR system, the resource block (RB) 507 may be defined by N continuous subcarriers ($N_{SC}^{RB}$) 508 in the frequency domain. The number of subcarriers ($N_{SC}^{RB}$) may be 12. The frequency domain may include a common resource blocks (CRB), and a physical resource block (PRB) may be defined in the bandwidth part (BWP) on the frequency domain.

Numbers of the CRB and PRB may be determined differently according to the subcarrier spacing.

Downlink control information may be transmitted in the initial N OFDM symbol(s) in a slot. N={1, 2, 3}, and the terminal may receive, through higher layer signaling from the base station, a configuration on the number of symbols in which downlink control information can be transmitted. In addition, according to the amount of control information to be transmitted in a current slot, the base station may change the number of symbols for each slot, in which downlink control information can be transmitted in the slot, and may deliver information on the number of symbols via a separate downlink control channel to the terminal.

Scheduling information on downlink data or uplink data in the NR and/or LTE system may be transmitted from a base station to a terminal through downlink control information (DCI). In various embodiments, the DCI may be defined according to various formats, and each format may indicate: whether the DCI includes scheduling information (e.g., UL grant) on uplink data or includes scheduling information (DL grant) on downlink data; whether the DCI is a compact DCI including a small size of control information; whether the DCI is a fall-back DCI; whether spatial multiplexing using multiple antennas is applied to the DCI; and/or whether the DCI is for power control.

For example, the DCI format (e.g., DCI format 1_0 of NR), which is scheduling control information (DL grant) for downlink data, may include at least one of the following control information. NR DCI format 1_0 may include scheduling for downlink data.

Control information format identifier (DCI format identifier): an identifier for identifying a DCI format Frequency domain resource assignment: indicates an RB allocated for data transmission Time domain resource assignment: indicates a symbol and a slot allocated for data transmission.

VRB-to-PRB mapping: indicates whether to apply a virtual resource block (VRB) mapping scheme.

Modulation and coding scheme (MCS): indicates a modulation method used for data transmission and the size of a transport block which is data to be transmitted.

New data indicator: indicates whether it is HARQ initial transmission or retransmission.

Redundancy version: indicates a redundancy version of the HARQ.

HARQ process number: indicates a process number of the HARQ.

Physical downlink shared channel (PDSCH) allocation information (Downlink assignment index): indicates, to a terminal, the number of PDSCH reception results (e.g., the number of HARQ-ACKs) to be reported to a base station Transmit Power Control (TPC) command for physical uplink control channel (PUCCH): indicates a transmit power control command for a PUCCH which is an uplink control channel PUCCH resource indicator: indicates a PUCCH resource used for HARQ-ACK report including the reception result for the PDSCH configured through the corresponding DCI PUCCH transmission timing indicator (PDSCH-to-HARQ_feedback timing indicator): indicates a slot or symbol information in which PUCCH for HARQ-ACK report including the reception result for the PDSCH configured through the corresponding DCI needs to be transmitted The DCI may be transmitted over a physical downlink control channel (PDCCH or control information, hereinafter, used in combination) or enhanced PDCCH (EPDCCH or enhanced control information, hereinafter used in combination), which is a downlink physical control channel, through a channel coding and modulation process. Hereinafter, transmission and reception of the PDCCH or EPDCCH may be understood as DCI transmission and reception over the PDCCH or EPDCCH, and transmission and reception of a physical downlink shared channel (PDSCH) may be understood as transmission and reception of downlink data over a PDSCH.

In various embodiments, a cyclic redundancy check (CRC) scrambled by a specific radio network temporary identifier (RNTI or cell identifier (C-RNTI)), which is independent of each terminal, is added to DCI, and the DCI for each terminal may be channel-coded and then configured as an independent PDCCH to be transmitted. The PDCCH in the time domain may be transmitted during a control channel transmission period. A mapping position of the PDCCH in the frequency domain may be determined by at least an identifier (ID) of each terminal, and the PDCCH may be transmitted in an entire system transmission band or a configured frequency band among the system transmission band. Alternatively, the mapping position of the PDCCH in the frequency domain may be configured by higher layer signaling.

Downlink data may be transmitted over a physical downlink shared channel (PDSCH) which is a physical channel for downlink data transmission. The PDSCH may be transmitted after the control channel transmission interval, and scheduling information, such as a mapping position of PDSCH in a frequency domain and a modulation scheme for the PDSCH, may be determined based on the DCI transmitted via the PDCCH.

Through modulation and coding scheme (MCS) among control information constituting DCI, the base station may notify the terminal of the modulation scheme applied to the PDSCH to be transmitted and the size of data (transport block size (TBS)) to be transmitted. In various embodiments, the MCS may be configured by 5 bits or more or fewer than 5 bits. The TBS corresponds to the size of TB on which channel coding for error correction has not been applied to data (transport block (TB)) to be transmitted by the base station.

The modulation scheme which supports for uplink and downlink data transmission in the NR system may include at least one of quadrature phase shift keying (QPSK), quadrature amplitude modulation (16QAM), 64QAM, and 256QAM, and modulation orders ($Q_m$) thereof may be 2, 4, 6, and 8, respectively. That is, 2 bits per symbol for the QPSK modulation, 4 bits per symbol for the 16QAM modulation, 6 bits per symbol for the 64QAM modulation, and 8 bits per symbol for the 256QAM modulation may be transmitted. In addition, a modulation scheme including 256QAM or more may be used according to system variations.

In the case of a system performing communication in an unlicensed band, a communication device (base station or terminal) to transmit a signal via an unlicensed band may perform a channel access procedure or LBT for the unlicensed band via which communication is to be performed before transmitting the signal, and in the case in which the unlicensed band is determined as in an idle state according to the channel access procedure, the communication device may access the unlicensed band to perform signal transmission. If the unlicensed band is determined as not in an idle state according to the performed channel access procedure, the communication device may not perform signal transmission.

The channel access procedure in the unlicensed band may be classified according to whether a channel access procedure starting point of the communication device is fixed (frame-based equipment (FBE)) or variable (load-based equipment (LBE)). In addition to the channel access procedure starting point, a communication device may be determined as an FBE device or an LBE device depending on whether the transmit/receive structure of the communication device has one period or has no period. Here, "a channel access procedure starting point is fixed" means that the channel access procedure of a communication device may be periodically started according to a predefined period or a period declared or set by the communication device. As another example, "a channel access procedure starting point is fixed" may mean that the transmitting or receiving structure of a communication device has one period. Here, "the channel access procedure starting point is variable" means that the channel access procedure starting point of the communication device is available at any time the communication device is to transmit a signal via an unlicensed band. As another example, "a channel access procedure starting point is variable" may mean that the transmitting or receiving structure of a communication device may be determined as needed, without having one period.

Hereinafter, description will be given of a channel access procedure (hereinafter, a traffic-based channel access procedure or an LBE-based channel access procedure) in the case in which a channel access procedure starting point of a communication device is variable (LBE).

A channel access procedure in an unlicensed band may include measuring the intensity of a signal received via the unlicensed band for a fixed time or a time calculated according to a predefined rule (e.g., a time calculated through one random value selected by at least a base station or a terminal). Next, the channel access procedure in the unlicensed band may include a procedure for determining an idle state of the unlicensed band, by comparing a measurement result with a predefined threshold value or a threshold valued calculated by a function which determines the size of the received signal intensity according to at least one variable of a channel bandwidth, a bandwidth of a signal to be transmitted, and/or an intensity of transmission power.

For example, the communication device may measure the intensity of a signal received during X µs (e.g., 25 µs) immediately before a starting point at which the communication is to transmit a signal, and in the case where the measured signal intensity is smaller than a predefined or calculated threshold value T (e.g., −72 dBm), the communication device may determine that the unlicensed band is in an idle state and transmit the configured signal. Here, the maximum time available for continuous signal transmission after the channel access procedure may be limited according to the maximum channel occupancy time defined for each country, region, and frequency band in accordance with each unlicensed band and may also be limited according to the type of a communication device (e.g., a base station, a terminal, a master device, or a slave device). For example, in Japan, in a 5 GHz unlicensed band, a base station or a terminal may occupy a channel and transmit a signal without performing an additional channel access procedure up to for 4 ms time for the unlicensed band which is determined as in an idle state after a channel access procedure is performed.

More specifically, when a base station or a terminal is to transmit a downlink or uplink signal via an unlicensed band, a channel access procedure that may be performed by the base station or the terminal may be divided into at least the following types.

A first type (Type 1): transmit an uplink/downlink signal after performing a channel access procedure for a variable time A second type (Type 2): transmit an uplink/downlink signal after performing a channel access procedure for a fixed time A third type (Type 3): transmit an uplink/downlink signal without performing a channel access procedure A transmitting device (e.g., a base station or a terminal) that is to perform signal transmission via an unlicensed band may determine a scheme (or type) of a channel access procedure according to the type of a signal to be transmitted. In 3GPP, an LBT procedure, which is a channel access scheme, may be largely divided into four categories. The four categories may include: a first category which is a scheme in which LBT is not performed; a second category which is a scheme in which LBT is performed without random backoff; a third category which is a scheme in which LBT is performed through random backoff in a contention window having a fixed size; and a fourth category, which is a scheme in which LBT is performed through random backoff in a contention window having a variable size.

According to an embodiment, the type 1 may include the third category and the fourth category, the type 2 may include the second category, and the type 3 may include the first category. Here, the type 2 or the second category that performs the channel access procedure for a fixed time may be divided into one or more types according to the fixed time during which the channel access procedure is performed. For example, the type 2 may be divided into a type in which a channel access procedure is performed for a fixed time of A µs (e.g., 25 µs), and a type in which a channel access procedure is performed for a fixed time of B µs (e.g., 16 µs).

Hereinafter, for convenience of description, the description of the disclosure is based on an assumption that a transmitting device is a base station, and the transmitting device and the base station may be used in combination.

For example, when the base station is to transmit a downlink signal including a downlink data channel via an unlicensed band, the base station may perform the channel access procedure type 1 scheme. In addition, when the base station is to transmit a downlink signal including no downlink data channel via an unlicensed band, for example, to transmit a synchronization signal or a downlink control channel, the base station may perform the channel access procedure type 2 scheme and transmit the downlink signal.

In this case, a channel access procedure scheme may be determined according to the transmission length of a signal to be transmitted via an unlicensed band or the length of time or interval for which an unlicensed band is occupied and used. Generally, the channel access procedure in the type 1 may be performed longer than the channel access procedure in the type 2. Accordingly, when the communication device is to transmit a signal for a short period of time or a time equal to or less than a reference time (e.g., X ms or Y symbol), the channel connection procedure type 2 scheme may be performed. On the other hand, when the communication device is to transmit a signal for a longer time period or a time exceeding or equal to or greater than a reference time (e.g., X ms or Y symbol), the channel access procedure type 1 scheme may be performed. In other words, different channel access procedures may be performed according to the time during which the unlicensed band is used.

In the case in which the transmitting device performs the channel access procedure type 1 scheme according to at least one of the above-mentioned criteria, the transmitting device that is to transmit a signal via an unlicensed band may determine a channel access priority class (CAPC, or channel access priority) according to a quality of service class (QCI) of the signal and may perform the channel access procedure using at least one value among the configured values predefined as shown in [Table 1] in connection with the determined channel access priority class. [Table 1] below shows a mapping relationship between the channel access priority class and the QCI. Here, the mapping relationship between the channel access priority class and the QCI, as shown in [Table 1] is only an example, and is not limited thereto.

For example, QCI 1, 2, and 4 indicate QCI values for services, such as a conversational voice, a conversational video (live streaming), and a non-conversational video (buffered streaming), respectively. In the case where the transmitting device is to transmit a signal for a service which is not matched with the QCI in Table 1 to an unlicensed band, the transmitting device may select the closest QCI among the QCIs in Table 1 and may select a channel access priority class corresponding thereto.

TABLE 1

| Channel Access Priority | QCI |
| --- | --- |
| 1 | 1, 3, 5, 65, 66, 69, 70 |
| 2 | 2, 7 |
| 3 | 4, 6, 8, 9 |
| 4 | — |

In various embodiments, a parameter value for a channel access priority class (e.g., a defer duration, or a set of a contention window value or size (CW_p), the minimum and the maximum values of contention window (CW_min, p, CW_max, p), the maximum channel occupiable interval (T_mcot, p), etc. according to the determined channel access priority (p)) may be determined as shown in [Table 2] described below. [Table 2] shows parameter values for the channel access priority class in the case of downlink.

Figure 6:
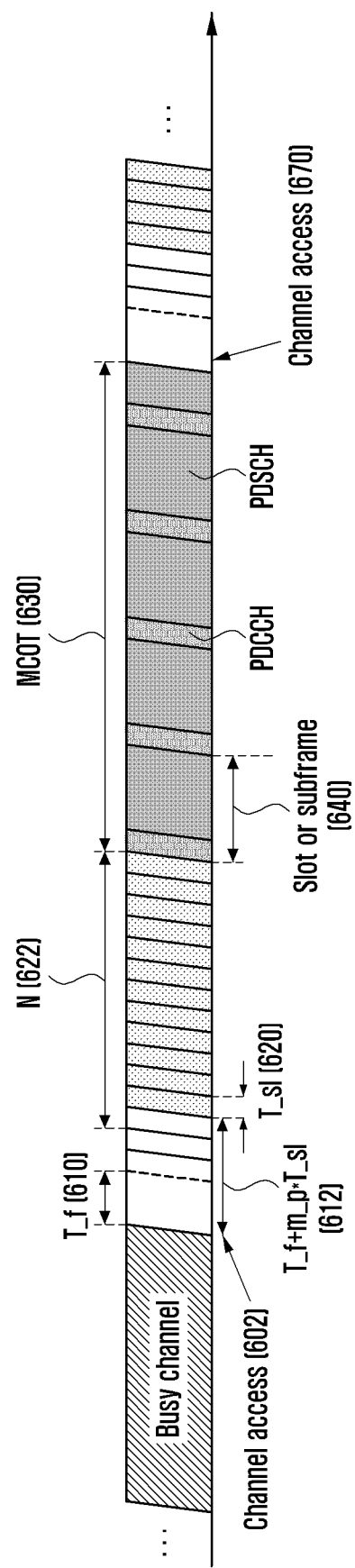
FIG. 6 illustrates an example of a channel access procedure in an unlicensed band in a wireless communication system according to an embodiment of the disclosure.

FIG. 6 illustrates an example of a channel access procedure in an unlicensed band in a wireless communication system according to an embodiment of the disclosure.

Description will be given on a situation in which a base station performs a channel access procedure so as to occupy an unlicensed band. The base station 110 of FIG. 1 is an example of the base station in above description.

Referring to FIG. 6, the base station that is to transmit a downlink signal via an unlicensed band may perform a channel access procedure 602 for the unlicensed band during a minimum T_f+m_p*T_sl time (e.g., the defer duration 612 of FIG. 6). In the case where the base station is to perform a channel access procedure using the channel access priority class 3 (p=3), the size, T_f+m_p*T_sl of the defer duration required to perform the channel access procedure may be configured to have a size of T_f+m_p*T_sl by using m_p=3. In relation to the size of the defer duration, T_f is 16 μs, which is a fixed value (e.g., the duration 610 in FIG. 6), the initial T_sl time in m_p*T_sl needs to be idle, and the base station may not perform the channel access procedure during the remaining time (T_f−T_sl) after the T_sl time during the T_f time. Here, even if the base station performs the channel access procedure during the remaining time (T_f−T_sl), the result of the channel access procedure may not be used. In other words, the T_f−T_sl time is a time during which a channel access procedure performed by the base station is deferred.

If the unlicensed band is determined as in an idle state during the entire time of m_p*T_sl, N may be equal to N−1. Here, N may be selected as a random integer value among values between 0 and the value of the contention window (CW_p) at the time point at which the channel access procedure is performed. For the channel access priority class 3, the minimum contention window value and the maximum contention window value are 15 and 63, respectively. If the unlicensed band is determined as in an idle state in the defer duration and an additional duration for which the channel access procedure is performed, the base station may transmit a signal via the unlicensed band for T_mcot, p time (e.g., 8 ms). Meanwhile, [Table 2] shows a channel access priority class (CAPC, or channel access priority) in downlink. In the disclosure, embodiments will be given based on a downlink channel access priority class for convenience of description. For uplink, the channel access priority class of [Table 2] may be used equally, or a separate channel access priority class for uplink transmission may be used.

TABLE 2

| Channel Access Priority Class (p) | $m_p$ | $CW_{min, p}$ | $CW_{max, p}$ | $T_{mcot, p}$ | allowed $CW_p$ sizes |
| --- | --- | --- | --- | --- | --- |
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

The initial contention window value (CW_p) denotes the minimum value in the contention window (CW_min, p). The base station, which selected an N value 622, may perform a channel access procedure in the T_sl duration (e.g., the slot duration 620 in FIG. 6), change the N value to be equal to N−1 value when the unlicensed band is determined as in an idle state through the channel access procedure performed in the T_sl duration, and transmit a signal for the maximum time, T_mcot,p (e.g., the maximum occupancy time 630 in FIG. 6) via the unlicensed band when the N value becomes 0. If the unlicensed band determined through the channel access procedure in T_sl time is not in an idle state, the base station may perform the channel access procedure again without changing the N value.

The size of the contention window (CW_p) value may be changed or maintained according to the ratio (Z) of NACK among the reception results (ACK/NACK) for downlink data (that is, downlink received in a reference subframe, a reference slot, or a reference transmission time interval (reference TTI)) transmitted or reported to the base station by one or more terminals that have received downlink data transmitted via a downlink data channel in a reference subframe, a reference slot, or a reference transmission time interval (reference TTI). The reference subframe, the reference slot, or the reference transmission time interval (reference TTI) may be determined by a first subframe, slot, or transmission time interval (TTI) of a downlink signal transmission interval (or a maximum channel occupancy time (MCOT)), which is the most recently transmitted by a base station via an unlicensed band at a time point at which the base station initiates a channel access procedure, at a time point at which the base station selects an N value to perform the channel access procedure, or at a time just before the two time points.

Referring to FIG. 6, the base station may attempt channel access in order to occupy an unlicensed band. A first slot (or starting slot that initiates a channel occupancy interval), subframe, or transmission interval 640 of a downlink signal transmission interval (COT) 630, in which a signal is the most recently transmitted by the base station via the unlicensed band, at a time point at which a channel access procedure 670 is initiated, a time point at which the base station selects an N value to perform the channel access procedure, or a time point immediately before the time points may be defined as a reference slot, reference subframe, or a reference transmission interval, which are referred to as a reference slot hereinafter for convenience of description. Specifically, one or more continuous slots including a first slot, in which a signal is transmitted, among all slots of the downlink signal transmission interval 630, may be defined as a reference slot. In addition, according to an embodiment, when the downlink signal transmission interval starts after a first symbol in a slot, a slot that starts downlink signal transmission and a slot after the slot may be defined as a reference slot. When the ratio of NACK among the reception results for downlink data transmitted or reported to the base station by one or more terminals which received the downlink data transmitted via the downlink data channel in the reference slot is Z or higher, the base station may determine the value or size of the contention window used in a channel access procedure 670 of the corresponding base station as the next largest contention window than the contention window used in the previous channel access procedure 602. In other words, the base station may increase the size of the contention window used in the channel access procedure 602. The base station may perform a next channel access procedure 670 by selecting an N (622) value in a range defined according to the contention window having an increased size.

If the base station is unable to obtain the reception result for the downlink data channel transmitted in the reference slot of the transmission interval 630, for example, when the time point interval between the reference slot and the time point 670 at which the base station initiates a channel access procedure is less than n slot or symbol (that is, when the base station initiates a channel access procedure before the minimum time during which the terminal is able to report on the reception result of the downlink data channel, which is transmitted in the reference slot, to the base station), a first slot of the most recent transmission interval of a downlink signal transmitted before the downlink signal transmission interval 630 may be a reference slot.

In other words, when the base station is unable to receive, from the terminal, the reception results for the downlink data transmitted in the reference slot 640 at a time point at which the base station initiates a channel access procedure 670, at a time point at which the base station selects an N value to perform the channel access procedure, or at a time just before the time points, the base station may determine a contention window by using the downlink data reception result of the terminal for the reference slot in the transmission interval of the downlink signal that is the most recently transmitted, among the reception results for the downlink data channel previously received from the terminals. In addition, the base station may determine the contention window size used in the channel access procedure 670 by using the downlink data reception result received from the terminals for downlink data transmitted via the downlink data channel in the reference slot.

For example, the base station, which transmitted a downlink signal through a channel access procedure (e.g., CW_p=15) configured according to the channel access priority class 3 (p=3), may increase a contention window from an initial value (CW_p=15) to a next value (CW_p=31) of the contention window, in the case in which 80% or more of the reception results of a terminal for downlink data transmitted to the terminal via a downlink data channel in a reference slot, among the downlink signals transmitted via an unlicensed band are determined as NACK. The ratio value of 80% is an example and may be variously modified.

If 80% or more of the reception results of the terminal are not determined as NACK, the base station may maintain a contention window value at a previous value or change the value to the initial value of the contention window. Here, the change of the contention window is applicable to all of the channel access priority classes or applicable only to a channel access priority class used in the channel access procedure. In the reference slot where the change of the contention window size is determined, the method for determining the reception result valid for the determination to change the contention window size, that is, the method for determining a Z value, among the reception results for the downlink data transmitted or reported by the terminal to the base station for downlink data transmitted via the downlink data channel, is as follows.

If the base station transmits one or more codewords or TBs to one or more terminals, in the reference slot, the base station may determine a Z value for the TB received by the terminal from the reference slot, by using a ratio of NACK among the reception results transmitted or reported by the terminal. For example, when two codewords or two TBs are transmitted to one terminal, in the reference slot, the base station may receive or be notified of the reception result of the downlink data signal for the two 2 TBs from the terminal. If the ratio (Z) of the NACK, among the two reception results, is equal to or greater than a threshold value (e.g., Z=80%) defined in advance or configured between the base station and the terminal, the base station may change or increase the contention window size.

If the terminal bundles the reception result of the downlink data for one or more slots (e.g., M slots) including the reference slot and then transmits or reports the bundled result to the base station, the base station may determine that the terminal has transmitted M reception results. Further, the base station may determine the Z value using a ratio of NACK among M reception results, and may change, maintain, or initialize the contention window size.

If a reference slot is a second slot among the two slots included in one subframe, or when a downlink signal is transmitted in a symbol after a first symbol in the reference slot, the reference slot and the next slot is determined as reference slots, and the Z value may be determined by a ratio of NACK among reception results transmitted or reported by the terminal to the base station for downlink data received in the reference slot.

In addition, description will further given for the case in which scheduling information or downlink control information for a downlink data channel transmitted by a base station is transmitted in a cell in which a downlink data channel is transmitted, a cell identical to a frequency band, or a frequency band, or the case in which scheduling information or downlink control information for a downlink data channel transmitted by a base station is transmitted via an unlicensed band but is transmitted in a cell or a frequency band different in a cell in which the downlink data channel is transmitted. In the above-described cases, in the case where the terminal is determined as having not transmitted the reception result for the downlink data received in a reference slot, and the reception result for the downlink data transmitted by the terminal is determined as at least one of discontinuous transmission (DTX), NACK/DTX, or any state, the base station may determine the Z value by determining the reception result of the terminal as NACK.

In addition, in the case in which scheduling information or downlink control information for a downlink data channel transmitted by a base station is transmitted via a license band, when the reception result for downlink data transmitted by the terminal is determined at least one of DTX, NACK/DTX, or any state, the base station may not reflect the reception result of the terminal on the reference value Z of the contention window variation. In other words, the base station may determine the Z value while ignoring the reception result of the terminal.

In addition, in the case in which the base station transmits scheduling information or downlink control information for a downlink data channel via a licensed band, when the base station actually transmits no downlink data (no transmission), among the reception results of the downlink data for the reference slot transmitted or reported by the terminal to the base station, the base station may determine the Z value while ignoring the reception result transmitted or reported by the terminal for the downlink data.

Hereinafter, description will be given on a channel access procedure (hereinafter, referred to as a frame-based channel access procedure or an FBE-based channel access procedure) in the case where a channel access procedure starting point of a communication device is fixed (FBE) with reference to FIG. 7.

Figure 7:
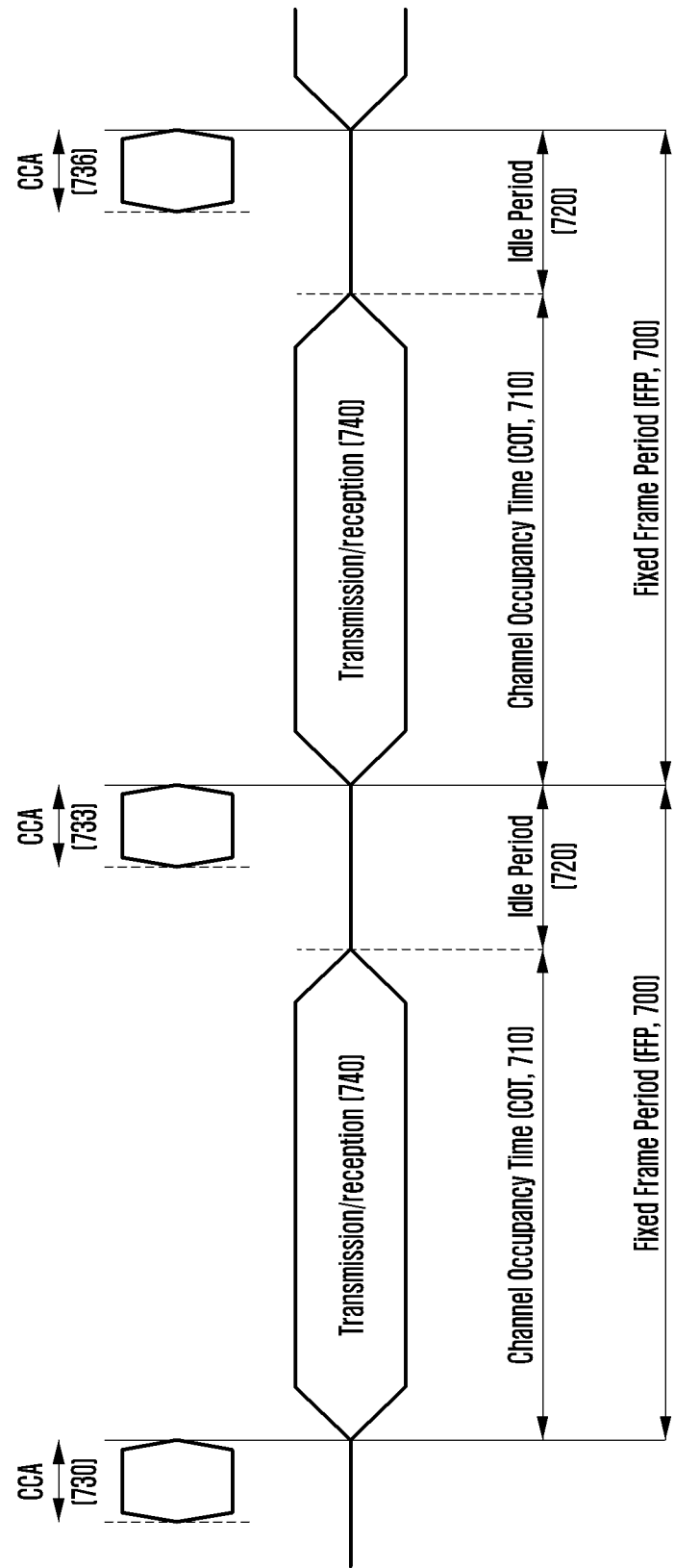
FIG. 7 illustrates another example of a channel access procedure in an unlicensed band in a wireless communication system according to an embodiment of the disclosure.

FIG. 7 illustrates another example of a channel access procedure in an unlicensed band in a wireless communication system according to an embodiment of the disclosure.

A communication device configured to perform a frame-based channel access procedure may periodically transmit and receive a signal according to a fixed frame period (FFP). Here, a communication device (e.g., a base station) may declare or configure the fixed frame period 700, and the fixed frame period may be configured from 1 ms to 10 ms. Here, the channel access procedure (or clear channel access (CCA)) for the unlicensed band may be performed immediately before the start of each frame period 730, 733, and 736, and the channel access procedure may be performed during a fixed time such as in the above-mentioned channel access procedure type 2 or one observation slot. If, as a result of the channel access procedure, the unlicensed band is determined as in an idle state or an idle channel, the communication device may transmit or receive a signal 740 without performing a separate channel access procedure for the maximum time up to 95% of the fixed frame period 700 (i.e., channel occupancy time (COT)) 710. Here, the minimum time 5% of the fixed frame period 700 is an idle time 720 during which a signal cannot be transmitted or received, and a channel access procedure may be performed within the idle time 720.

The frame-based channel access procedure may provide a relatively simple method for performing a channel access procedure, compared to the traffic-based channel access procedure, and allow the channel access in the unlicensed band to be periodically performed. However, since the channel access procedure starting time is fixed, the probability of accessing the unlicensed band is reduced, compared to the traffic-based channel access procedure.

Figure 8:
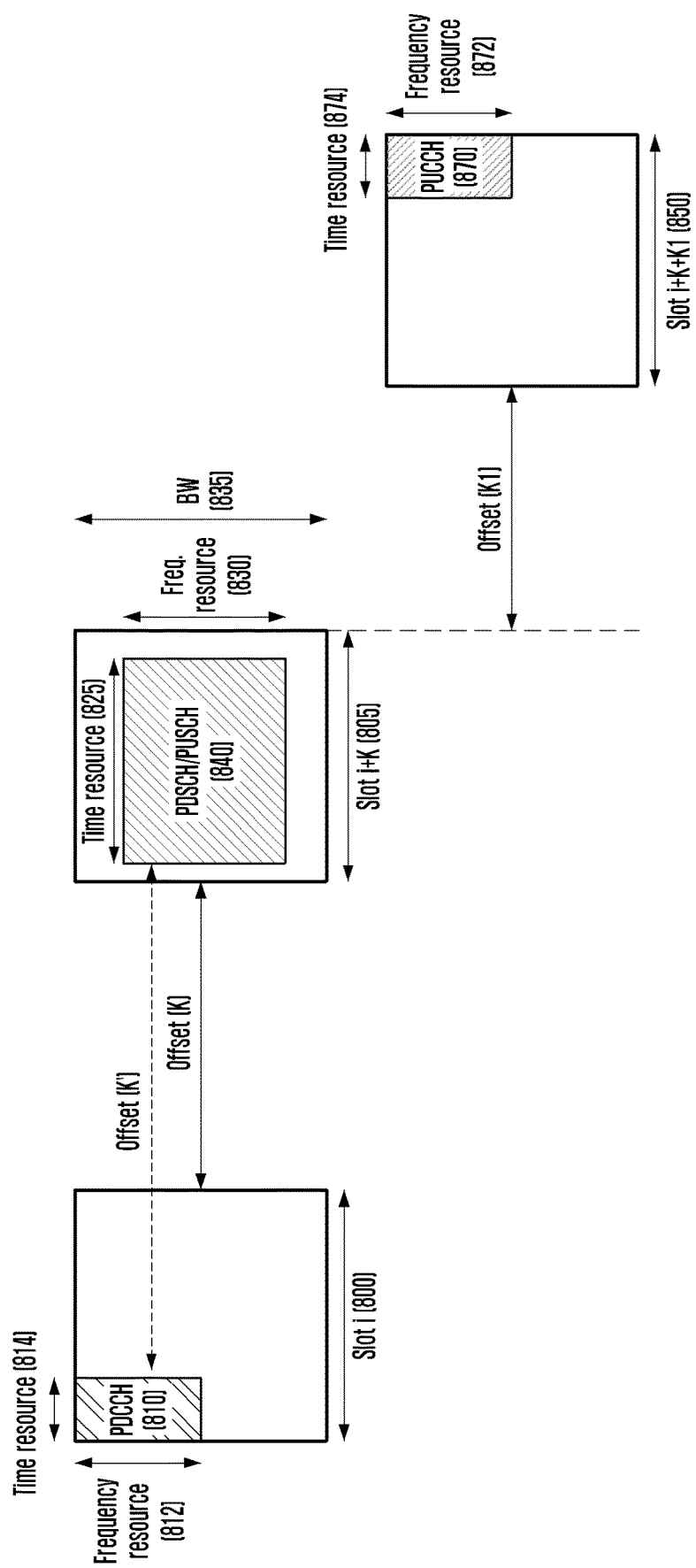
FIG. 8 illustrates an example of scheduling and feedback in a wireless communication system according to an embodiment of the disclosure.

FIG. 8 illustrates an example of scheduling and feedback in a wireless communication system according to an embodiment of the disclosure.

The base station may transmit control information including downlink and/or uplink scheduling to the terminal. The base station may transmit downlink data to the terminal. The terminal may transmit HARQ-ACK information, which is feedback for downlink data, to the base station. Alternatively, the terminal may transmit uplink data to the base station. In the NR system, the uplink and downlink HARQ schemes may include an asynchronous HARQ scheme in which data retransmission time point is not fixed. For example, in the case of downlink, when the base station receives feedback on HARQ NACK from the terminal for the initial transmission data, the base station may freely determine the transmission time point of the retransmission data according to the scheduling operation. For an HARQ operation, the terminal may perform buffering on the data determined as an error according to a result of decoding of received data, and then combine the erroneous data with data retransmitted from a base station. The base station 110 in FIG. 1 and the terminal 120 or the terminal 130 of FIG. 1 are examples of the base station and the terminal in the above description.

A resource region in which a data channel is transmitted in the 5G or NR communication system is illustrated with reference to FIG. 8. The terminal may monitor and/or search PDCCH 810 in a downlink control channel (hereinafter referred to as PDCCH) region (hereinafter referred to as a control resource set (CORESET) or search space (SS)) configured via a higher layer signal from the base station. Here, the downlink control channel region is configured by information of time domain 814 and frequency domain 812, and information of the time domain 814 may be configured by a symbol unit and information of the frequency domain 812 may be configured by an RB or a group unit of the RB.

If the terminal detects the PDCCH 810 in a slot i 800, the terminal may obtain downlink control information (DCI) transmitted via the detected PDCCH 810. The terminal may obtain scheduling information for downlink data channel or uplink data channel 840 through the received downlink control information (DCI). In other words, the DCI may at least include: resource region (or PDSCH transmission region) information in which a terminal needs to receive a downlink data channel (hereinafter referred to as PDSCH) transmitted from a base station; or resource region information allocated from the base station for the terminal to transmit an uplink data channel (physical uplink shared channel (PUSCH)).

For example, the case in which the terminal is scheduled for uplink data channel (PUSCH) transmission will be described as follows. The terminal which has received DCI may obtain slot index or offset information (K) that needs to receive the PUSCH through DCI, and may determine PUSCH transmission slot index. For example, the terminal may determine as having been scheduled to transmit the PUSCH in slot i+K 805 through the received offset information (K), with reference to the slot index i 800 in which the PDCCH 810 is received. Here, the terminal may determine PUSCH starting symbol or time in the slot i+K 805 or slot i+K through the received offset information (K), based on CORESET which has received the PDCCH 810.

In addition, the terminal may obtain information on the PUSCH transmission time-frequency resource region 840 in the PUSCH transmission slot 805 from DCI. The PUSCH transmission frequency resource region information 830 may include a physical resource block (PRB) or group unit information of the PRB. Meanwhile, the PUSCH transmission frequency resource region information 830 may be information on a region included in an initial uplink bandwidth (BW) or an initial uplink bandwidth part (BWP) determined or configured to the terminal through an initial access procedure. If the terminal is configured on the uplink bandwidth (BW) or the uplink bandwidth part (BWP) via the higher layer signal, the PUSCH transmission frequency resource region information 830 may be information on a region included in an uplink bandwidth (BW) 835 or an uplink bandwidth part (BWP) received via the higher layer signal.

In various embodiments, the PUSCH transmission time resource region information 825 may be a symbol or group unit information of the symbol, or information indicating absolute time information. The PUSCH transmission time resource region information 825 may be represented by a PUSCH transmission starting time, a length of a symbol and a PUSCH, a PUSCH ending time, or a combination of symbols, and then may be included in DCI as one field or value. The terminal may transmit the PUSCH in the PUSCH transmission resource region 840 determined through the DCI.

In various embodiments, the terminal which has received the PDSCH 840 may feedback the reception result (e.g., HARQ-ACK/NACK) for the PDSCH 840 to the base station. Here, the transmission resource of the uplink control channel (PUCCH) 870, which transmits the reception result for the PDSCH 840, may be determined by the terminal, based on a PDSCH-to-HARQ timing indicator and a PUCCH resource indicator indicated through DCI 810 for scheduling the PDSCH 840. In other words, the terminal that has received the PDSCH-to-HARQ timing indicator K1 through the DCI 810 may transmit PUCCH 870 in a slot i+K+K1 850 after K1 starting in the slot 805 for receiving PDSCH 840.

The base station may configure one or more K1 values to the terminal via higher layer signaling, or may indicate a specific K1 value to the terminal through the DCI as described above. The K1 may be determined according to HARQ-ACK processing capability of a terminal, in other words, the minimum time required for the terminal to receive a PDSCH and generate and report the HARQ-ACK for the PDSCH. In addition, the terminal may use a pre-defined value or a default value as a K1 value until the terminal receives a configuration on the K1 value.

Here, the transmission resource of the PUCCH 870 in the PUCCH transmission slot 850 may perform PUCCH transmission in a resource (defined by a time domain 874 and a frequency domain 872) indicated through the PDCCH resource indicator of the DCI 810. Here, when a plurality of PUCCH transmissions are configured or indicated in the PUCCH transmission slot 850, the terminal may perform PUCCH transmission in the PUCCH resource other than the resource indicated through the PUCCH resource indicator of the DCI 810.

In the 5G communication system, whether each of OFDM symbols constituting one slot is a downlink symbol or an uplink symbol or a flexible symbol may be indicated by a slot format indicator (SFI) in order to dynamically change a downlink signal transmission and uplink signal transmission interval in a time division duplex (TDD) system. Here, the symbol indicated as a flexible symbol is neither a downlink symbol nor an uplink symbol or refers to a symbol that may be changed to a downlink or uplink symbol by terminal specific control information or scheduling information. In this case, the flexible symbol may include a gap guard required in a process of switching from downlink to uplink.

The slot format indicator may be simultaneously transmitted to a plurality of terminals via a terminal group (or cell) common control channel. In other words, the slot format indicator may be transmitted via a PDCCH with CRC scrambled by a terminal unique identifier (C-RNTI (cell-RNTI)) and a different identifier (e.g., SFI-RNTI). In various embodiments, the slot format indicator may include information on N slots, and the N value may be an integer greater than 0 or a natural value, or the value set by the base station to the terminal via an higher layer signal, among a set of available values including 1, 2, 5, 10, 20, etc., which are defined in advance. In addition, the base station may configure the size of the slot format indicator information via a higher layer signal to the terminal. Table 3 shows an example of a slot format that may be indicated by the slot format indicator.

TABLE 3

| Format | Symbol number (or index) in one slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | F | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | F | U | D | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | F | F | U | D | D | D | F | F | U | U | U |
| 50 | D | D | F | F | U | U | D | D | F | F | U | U | U | U |
| 51 | D | F | F | U | U | U | D | F | F | U | U | U | U | U |

TABLE 3-continued

| For-mat | Symbol number (or index) in one slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | Reserved | | | | | | | | | | | | | |
| 255 | UE determines the slot format for the slot based on TDD-UL-DL-ConfigurationCommon, or TDD-UL-DL-ConfigDedicated and, if any, on detected DCI formats | | | | | | | | | | | | | |

In Table 3, D denotes downlink, U denotes uplink, and F denotes a flexible symbol. According to Table 3, the total number of supportable slot formats is 256. In the current NR system, the maximum size of the slot format indicator information bit is 128 bits, and the slot format indicator information bit is a value that can be set by the base station to the terminal via a higher layer signal (e.g., dci-payload-size).

In various embodiments, the slot format indicator information may include a slot format for a plurality of serving cells, and a slot format for each serving cell may be identified through a serving cell ID. In addition, each serving cell may include a slot format combination for one or more slots. For example, if the size of slot format indicator information bit is 3 bits and the slot format indicator information is configured as a slot format indicator for one serving cell, the 3 bit slot format indicator information may be one of a total of eight slot format indicators or slot format combinations (hereinafter, slot format indicators), and the base station may indicate one of the eight slot format indicators through terminal group common DCI (hereinafter, slot format indicator information).

In various embodiments, at least one slot format indicator of the eight slot format indicators may be configured as a slot format indicator for a plurality of slots. For example, [Table 4] shows an example of 3 bit slot format indicator information configured using the slot format of [Table 3]. Five (slot format combination ID 0, 1, 2, 3, and 4) of the slot format indicator information are slot format indicators for a single slot, and the remaining three are information on slot format indicators (slot format combination IDs 5, 6, and 7) for four slots, which may be sequentially applied to the four slots.

TABLE 4

| Slot format combination ID | Slot Formats |
|---|---|
| 0 | 0 |
| 1 | 1 |
| 2 | 2 |
| 3 | 19 |
| 4 | 9 |
| 5 | 0 0 0 0 |
| 6 | 1 1 1 1 |
| 7 | 2 2 2 2 |

The terminal may receive configuration information on the PDCCH, in which a slot format indicator information needs to be detected, via a higher layer signal and may detect the slot format indicator according to the configuration. For example, the terminal may receive a configuration on a CORESET in which slot format indicator information needs to be detected, a search space, and at least one of RNTI information used for CRC scrambling of DCI by which a slot format indicator information is transmitted, a period of the search space, and offset information via a higher layer signal.

Figure 9A:
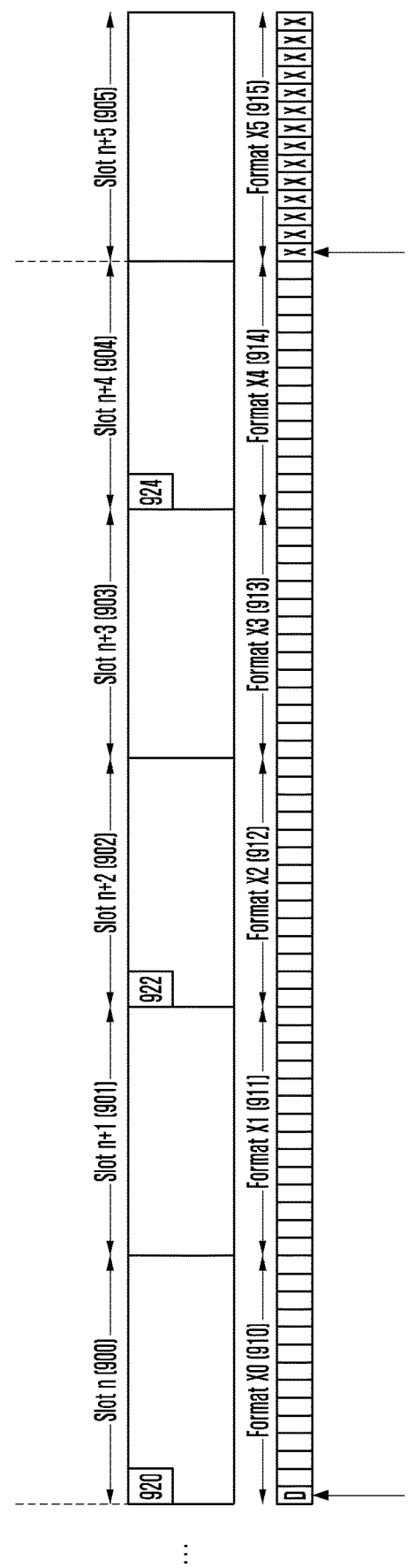
FIG. 9A illustrates an example of a channel occupancy time and a slot format in a wireless communication system according to an embodiment of the disclosure.

FIG. 9A illustrates a channel occupancy time in a wireless communication system according to an embodiment of the disclosure.

PDCCH regions 920, 922, and 924 in which the terminal needs to detect slot format indicator information and the case in which a period of each of the PDCCH regions is two slots are illustrated with reference to FIG. 9A. In other words, the terminal may detect DCI with CRC scrambled by a slot format indicator identifier (e.g., SFI-RNTI or new RNTI) in the PDCCH regions 920, 922, and 924 (e.g., CORESET) of slot n 900, slot n+2 902, and slot n+4 904 according to the configured PDCCH region and a period thereof, and may obtain slot format indicators for two slots through the detected DCI. In this case, the detected DCI may include slot format indicator information for two or more slots, and the number of slots for which the slot format indicator is to be included in the DCI may be configured via a higher layer signal. Configuration information on the number of slots for which the slot format indicator is to be included in the DCI may be included in the same higher layer signal as the higher layer signal through which the slot format indicator information is configured. For example, referring to FIG. 9A, the terminal may obtain slot format indicator information 910 and 911 for slot n 900 and slot n+1 901 in the PDCCH region 920 of the slot n 900. Similarly, referring to FIG. 9A, the terminal may obtain slot format indicator information 912 and 913 for slot n+2 902 and slot n+3 903 in the PDCCH region 922 of the slot n+2 902. Here, the slot format indicator information 910, 911, 912, 913, and 914 may have at least one value among the formats in [Table 3]. The terminal may have a new format other than the format in Table 3.

When the base station transmits the slot format indicator information in the unlicensed band, particularly, when the slot format indicator information includes slot format indicators for a plurality of slots, the base station may not determine slot format indicator information for at least one slot according to whether or not a channel is connected to the unlicensed band. The base station needs to determine how to indicate the slot format indicator information for slot n+5 905 when the base station transmits the slot format indicator information 914 and 915 for slots n+4 904 and slot n+5 905 from PDCCH region 924. For example, the base station may indicate that the slot format indicator for a time other than the channel occupancy time is flexible.

Description will be given on a method for allocating uplink resources below. Uplink resources for transmitting signals or data may be allocated continuously or discontinuously, and when a specific resource allocation type is determined, information indicating uplink resource allocation is interpreted according to the specific resource allocation type. On the other hand, in the 3GPP standard, a signal and a channel are used separately, but in the disclosure, an uplink transmission signal or an uplink transmission channel are used without being separately discriminated, or an uplink transmission signal is used as a meaning including all of the uplink transmission signal or the uplink transmission channel or representing the same. This is because the scheme for determining the uplink resource allocation scheme or the uplink transmission starting position proposed in the disclosure may be commonly applied to both the uplink transmission signal and the uplink transmission channel, respectively. Even without a separate discrimination or description, the scheme for determining the uplink resource allocation scheme or the uplink transmission starting position proposed in the disclosure may be independently applied to each of the uplink transmission signal or the uplink transmission channel.

Uplink Resource Allocation Type 0

An uplink resource allocation type 0 scheme is a scheme in which resources are allocated in units of resource block groups (RBG) configured by P continuous resource blocks (RBs). Here, the size P of the RBG may be configured by one of configuration 1 or configuration 2 via a higher layer signal, for example, the RBG-size value of PUSCH-Config, and the P may be determined as shown in Table 5, based on the information and the size of the activated uplink bandwidth part. Table 5 shows the size of the bandwidth part and the size of P according to the configured RBG value. The size of the bandwidth part is the number of PRBs constituting a bandwidth part.

TABLE 5

| Carrier Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

The number of total RBGs constituting the uplink bandwidth part ($N_{BWP}$) may be determined as $N_{RBG}$=ceiling ($N_{BWP}^{size}+N_{BWP}^{start}$ mod P)/P). Here, the size of a first RBG ($RBG_0$) is P–$N_{BWP}^{start}$ mod P. If ($N_{BWP}^{start}+N_{BWP}^{size}$) mod P is larger than 0, the size of the last RBG ($RBG_{last}$) is ($N_{BWP}^{start}+N_{BWP}^{size}$) mod P. If the size of ($N_{BWP}^{start}+N_{BWP}^{size}$) mod P is not larger than 0, the size of the last RBG ($RBG_{last}$) is P. The size of the remaining RBGs except for the first and last RBGs is P. "$N_{BWP}^{start}$" means a CRB in which the BWP correspondingly starts from $CRB_0$, and may be understood as a point where a specific BWP starts from the CRB. "$N_{BWP}^{size}$" means the number of RBs included in the BWP.

Here, the length of the frequency resource allocation information (or size or number of bits) is the same as that of the $N_{RBG}$, and the terminal may receive a configuration or be scheduled on resources configured or scheduled for uplink transmission for each RBG in RBG units through a bitmap configured by $N_{RBG}$ bits. For example, the terminal may determine that the RBG region configured as 1 in the bitmap is a resource allocated for uplink transmission, and the RBG region configured as 0 is not a resource allocated for uplink transmission. Here, the RBG bitmap is aligned and mapped sequentially (ascending) toward the axis in which frequency increases. Continuous or non-contiguous RBGs may be allocated for uplink transmission through such a scheme.

Uplink Resource Allocation Type 1

An uplink resource allocation type 1 scheme is a scheme in which continuous frequency resources are allocated within the activated uplink bandwidth part. Frequency resource allocation information of the uplink resource allocation type 1 scheme may be indicated to the terminal through a resource indication value (RIV).

The length of the frequency resource allocation information (or size or number of bits) is equal to ceiling ($\log_2$ ($N_{BWP}$ ($N_{BWP}$+1)/2)). The RIV indicates the start of the frequency resource allocation RB ($RB_{start}$) and L continuously assigned RBs ($L_{RB}$) as follows.

If $(L_{RBs} - 1) \leq \left\lfloor \frac{N_{BWP}}{2} \right\rfloor$ then $RIV = N_{BWP}(L_{RBs} - 1) + RB_{start}$ -continued Else, $RIV = N_{BWP}(N_{BWP} - L_{RBs} - 1) + (N_{BWP} - 1 - RB_{start})$ where, $L_{RBs} \geq 1$ and shall not exceed $N_{BWP} - RB_{start}$ wherein the $N_{BWP}$ denotes the size of an active uplink bandwidth part and is expressed by the number of PRBs, the $RB_{start}$ denotes the first PRB starting uplink resource allocation, and the $L_{RB}$ denotes the length or the number of continuous PRBs. In this case, when one of DCIs (hereinafter referred to as UL grant) for configuring or scheduling uplink transmission, for example, DCI format 0_0 is transmitted in a common search space (CSS), the size of a used initial uplink bandwidth part is $N_{BWP,0}$.

In addition, in the case of one DCI format of the UL grants, for example, DCI format 0_0 transmitted in an UE specific common search space (USS), the size of the frequency resource allocation information of the UL grant or the number of bits is determined by the size of the initial bandwidth part ($N_{initial,BWP}$), but when the UL grant is DCI for scheduling another activated bandwidth part, the RIV values are $RB_{start}$=0, K, 2K, . . . , ($N_{initial,BWP}$–1)*K, and $L_{RB}$=K, 2K, . . . , $N_{initial,BWP}$·K and are as follows.

If $(L'_{RBs} - 1) \leq \left\lfloor \frac{N_{initial,BWP}}{2} \right\rfloor$ then $RIV = N_{initial,BWP}(L'_{RBs} - 1) + RB'_{start}$ Else, $RIV = N_{initial,BWP}(N_{initial,BWP} - L'_{RBs} - 1) + (N_{initial,BWP} - 1 - RB'_{start})$ where, $L'_{RBs} = \frac{L_{RBs}}{K}, RB'_{start} = \frac{RB_{start}}{K},$ $L'_{RBs}$ is $N_{initial,BWP} - RB'_{start}$ Uplink Resource Allocation Type 2

An uplink resource allocation type 2 scheme is a scheme in which an uplink signal or a channel transmission frequency resource is allocated to be distributed throughout an activated uplink bandwidth part, and is characterized in that the distances or intervals between the allocated frequency resources are the same or equal. In the uplink resource allocation type 2, resource allocation is evenly distributed all over a frequency band, and thus the type 2 is limitedly applicable during transmission of an uplink signal and channel transmitted in a carrier or cell or bandwidth part, operating in an unlicensed band in which requirements for frequency allocation, such as power spectral density (PSD) and occupancy channel bandwidth (OCB), need to be satisfied.

Figure 9B:
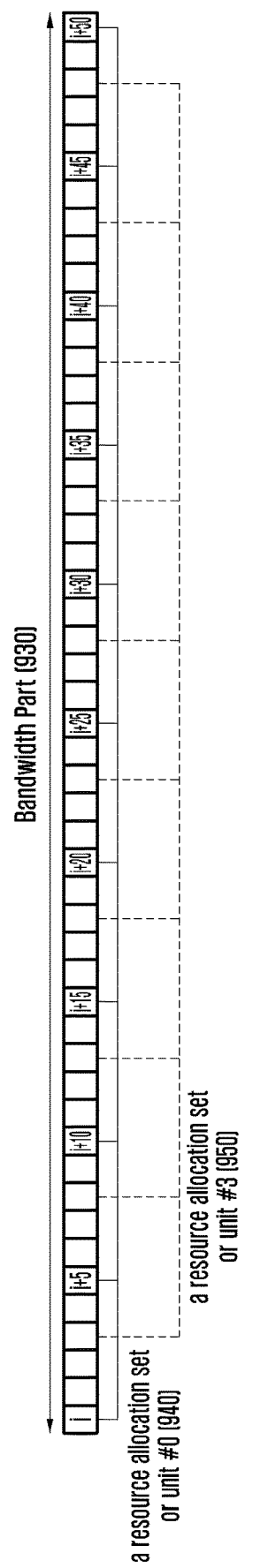
FIG. 9B illustrates a method for allocating frequency resources in a wireless communication system according to an embodiment of the disclosure.

FIG. 9B illustrates a method for allocating frequency resources in a wireless communication system according to an embodiment of the disclosure.

The uplink resource allocation type 2 scheme will be described as follows, with reference to FIG. 9B. FIG. 9B illustrates the case in which a terminal is configured to perform transmission and reception of an uplink signal with a base station via a bandwidth part 930, and scheduled on uplink data channel transmission through the uplink resource allocation type 2 scheme, under an assumption that the bandwidth part 930 is configured by 51 PRBs. According to the uplink resource allocation type 2 scheme, the 51 PRBs are configured by L resource region sets (in the case of FIG. 9B, L=5), and each resource region set may include $$\left[\frac{N_{BWP}}{L}\right] \text{ or } \left(\left[\frac{N_{BWP}}{L}\right]+1\right) PRBs.$$

In FIG. 9B, a first resource region set 940 includes 11 PRBs (#i, #i+5, #i+10, #i+15, . . . , #i+45, #i+50) and the remaining resource region sets, for example, a fourth resource region set 950 includes 10 PRBs (#i+3, #i+8, #i+13, #i+18, . . . , #i+48). In other words, the number of PRBs included in the resource region set may be different depending on the size of the bandwidth part or the number of PRBs in the bandwidth part. The terminal may be assigned one or more resource region sets configured as described above, and may be assigned (e.g., the resource region set #0, #1 or #2, #3, #4) continuous resource region sets through a method similar to the uplink resource allocation type 1 scheme (e.g., allocation based on RIV value) or may be assigned continuous or discontinuous resource region sets in a manner similar to the uplink resource allocation type 0 scheme (e.g., allocation based on a bitmap).

For example, similarly to the uplink resource allocation type 1, when the terminal is assigned a continuous resource region sets, the terminal may determine allocated frequency resource region (or allocated resource region set) by RIV (resource indication value) represented by the starting RB of frequency resource allocation ($RB_{start}$) and L continuous resource region sets, and the RIV value is as follows.

$$\text{If } (L-1) \leq \left\lfloor\frac{N}{2}\right\rfloor \text{ then } RIV = N(L-1) + RB_{start}$$
$$\text{Else, } RIV = N(N-L-1) + (N-1-RB_{start})$$

For example, "RIV=0" means a first resource region set or resource region set #0, and may mean that one resource region set including PRB #i, #i+10, #i+20, . . . , and #i+50 of FIG. 9B is allocated. Here, the length (or size or number of bits) of the frequency resource allocation information is equal to ceiling ($\log_2$ (L L+1)/2)).

For another example, in the case in which continuous or discontinuous resource region sets are allocated using a bitmap, a bitmap of L bits, which indicate L resource region sets constituting the bandwidth part 930 in the ascending order of frequency resources or the ascending order of resource region set indexes, may be configured, so that the resource region sets may be allocated using the bitmap. For example in FIG. 9B, a position of a resource region set may be indicated through a bitmap including 5 bits, and bitmap 10000 means that a first resource region set, that is, one resource region set including PRB #i, #i+10, #i+20, . . . , and #i+50 in FIG. 9B is allocated. Bitmap 00010 means that a fourth resource region set, that is, PRB #i+3, #i+8, #i+13, #i+18, . . . , and #i+48 in FIG. 9B is allocated. In this regard, the length (or the size or the number of bits) of the frequency resource allocation information is equal to L.

An Uplink Resource Allocation Type 3

Figure 9C:
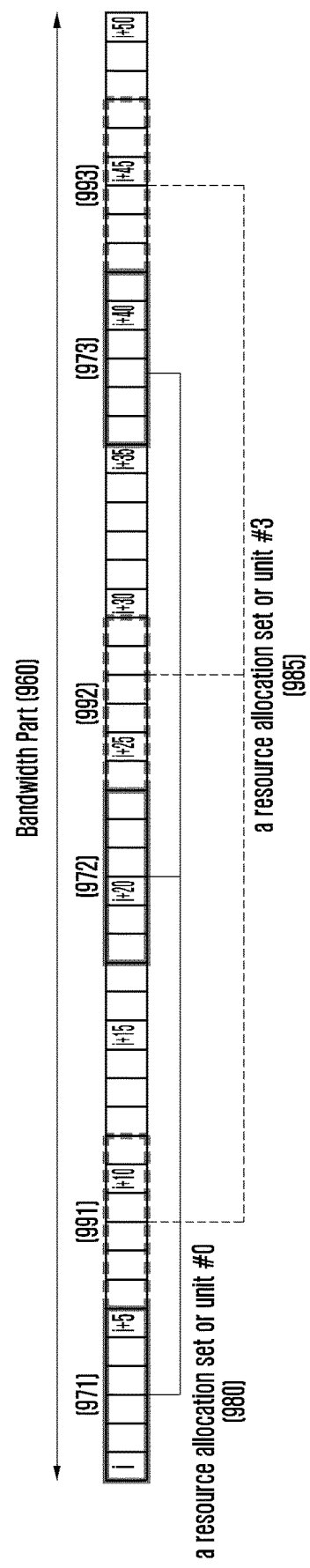
FIG. 9C illustrates another method for allocating frequency resources in a wireless communication system according to an embodiment of the disclosure.

FIG. 9C illustrates an uplink resource allocation type 3 according to an embodiment of the disclosure.

The uplink resource allocation type 3 scheme is a scheme in which a frequency resource for uplink signal or channel transmission is allocated to be distributed throughout an activated uplink bandwidth part 960. Specifically, in the uplink resource allocation type 3 scheme, allocation resource group (or allocation resource block or allocation resource cluster, e.g., 980 or 985), which is continuous resources, is distributed all over within the bandwidth part 960 through a method such as repetitive transmission (e.g., 971, 972, 973, and 991, 992, 993). That is, the allocation resource group 980, which is continuous resources, may be repeatedly present in frequency resources, such as 971, 972, and 973, and accordingly, a plurality of allocation resource groups may exist in the bandwidth part 960. In the uplink resource allocation type 3, a continuous allocation resource group (or block or cluster) is distributed in a frequency band, and thus the type 3 is limitedly applicable during transmission of an uplink signal and channel transmitted in a carrier or cell or bandwidth part, operating in an unlicensed band in which requirements for frequency allocation, such as power spectral density (PSD) and occupancy channel bandwidth (OCB) need to be satisfied.

The terminal may receive a configuration on the time resource region of the uplink data channel through the following method similarly to frequency. The time resource region of the uplink data channel may be indicated to the terminal through a start and length indicator value (SLIV). The SLIV is a value determined by a starting symbol (S) of time resource allocation in a slot and L continuously allocated symbols (L), which is as follows. If (L–1) is less than or equal to 7, an SLIV value is 14*(L–1)+S, and if (L–1) is greater than 7, an SLIV value is 14*(14–L+1)+(14–1–S). In this regard, the L value is greater than 0 and less than or equal to 14.

Additionally, a transmission starting position or a time point (hereinafter, a position) for the uplink signal or channel for transmitting an uplink signal in an unlicensed band may be instructed in more detail to the terminal by the base station or may be determined by the terminal. For example, the terminal may be instructed or receive a configuration by the base station on the starting symbol of uplink signal transmission that is transmitted in a specific slot by the terminal, the length of the uplink signal transmission or an uplink signal transmission starting symbol, and an uplink signal transmission ending symbol through DCI or an higher layer signal. In this regard, the terminal may be additionally instructed on a starting transmission position in a first symbol of the indicated or configured uplink signal transmission.

Figure 10:
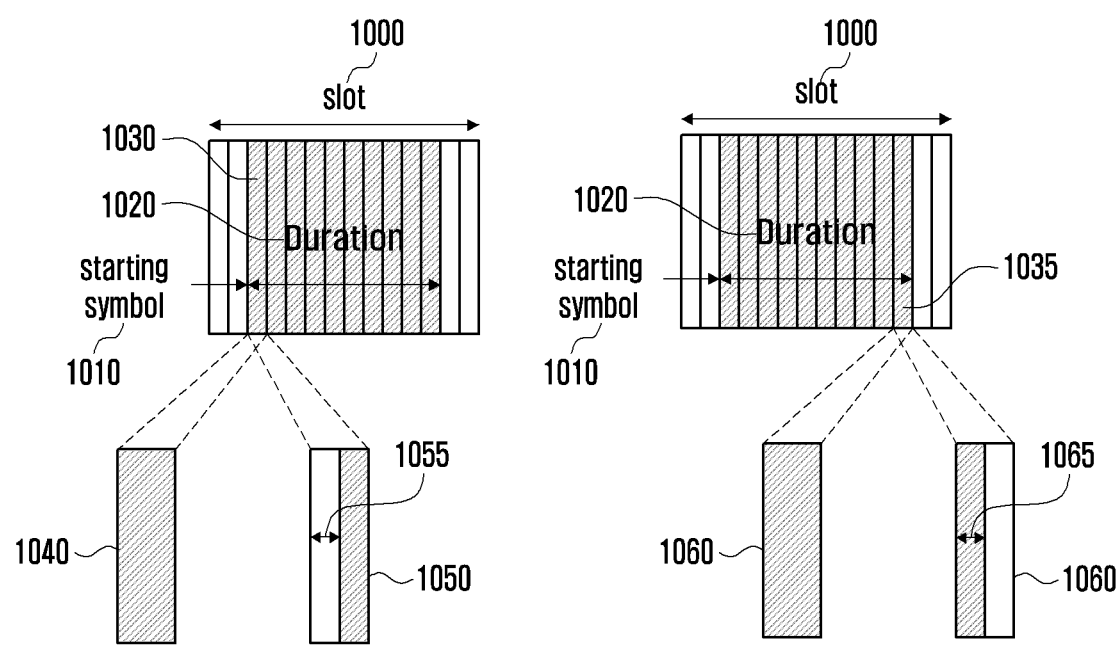
FIG. 10 illustrates a method for determining a time resource allocation region and a channel access procedure type in a wireless communication system according to an embodiment of the disclosure.

FIG. 10 illustrates a method for determining a time resource allocation region and a channel access procedure type in a wireless communication system according to an embodiment of the disclosure.

More detailed description is as follows with reference to FIG. 10. A terminal which has received DCI (or UL grant) for instructing or scheduling uplink signal transmission from a base station may determine the slot 1000 for transmitting the uplink signal by using at least one of the DCI, for example, time domain resource allocation information, the symbol 1010 in which uplink signal transmission is started in the slot 1000, and the length of the uplink signal transmission 1020 or the number of the transmission symbols. Here, the terminal that transmits an uplink signal in an unlicensed band may include a field that indicates a transmission starting position in the first symbol of uplink signal transmission in more detail to the DCI, for example, a field that indicates a starting position of an uplink signal or channel (UL signal/channel starting position). The terminal may determine the uplink signal transmission starting position of in the uplink starting symbol 1010 through the value configured through the field.

For example, in FIG. 10, the terminal may determine a symbol 1030, in which uplink signal transmission is started, through time domain resource allocation information of DCI, and may additionally determine whether the uplink signal is transmitted from a starting time or position of the symbol 1030 as shown in 1040, through the uplink signal starting position information of the DCI or is transmitted at a position after a predetermined time 1055, based on the starting time or position of the symbol 1030 as shown in 1050. The two different positions for uplink signal transmission in symbol 1030 as described in the above example are just an example, and the transmission positions may also be divided into more than two points.

On the other hand, similarly to the method for indicating a position where the uplink transmission is started in the transmission starting symbol of the uplink signal or channel, as described above, a position where the uplink transmission in the transmission ending (or last) symbol of an uplink signal or channel is terminated may also be indicated. That is, a terminal which transmits an uplink signal in an unlicensed band may include a field that indicates a transmission ending position in the last symbol of uplink signal transmission in more detail to the DCI, for example, an UL signal/channel ending position that indicates an ending position of an uplink signal or channel, and the terminal may determine an uplink signal transmission ending position in the last symbol 1035 of the uplink transmission through a value configured through the field.

For example, in FIG. 10, the terminal determines a symbol or the last symbol 1035, in which uplink signal transmission is terminated, through time domain resource allocation information of DCI, and may additionally determine whether the uplink signal is transmitted to an ending or last time or position of the symbol 1035, as shown in 1060, through the uplink signal ending position information of the DCI or is transmitted to a predetermined time 1065 from a starting time or position of the symbol 1035, as shown in 1065. Here, the two different positions for uplink signal transmission in symbol 1030 as described in the above example are just an example, and the transmission positions may also be divided into more than two points.

Figure 11:
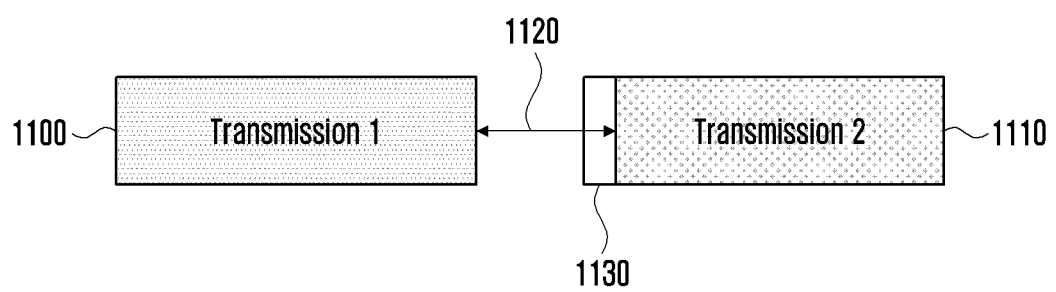
FIG. 11 illustrates two continuous transmissions and a gap therebetween in a wireless communication system according to an embodiment of the disclosure.

FIG. 11 illustrates two continuous transmissions and a gap therebetween in a wireless communication system according to an embodiment of the disclosure.

Here, additionally indicating the starting or ending position of the uplink signal transmission in the uplink transmission starting symbol or the transmission ending symbol as described above is required to allow the terminal or the base station to perform a channel access procedure through the transmission starting or ending position or to guarantee a gap between a base station and a terminal or between a terminal and the terminal or between signals or channels transmitted by a terminal and another terminal within a predetermined time or less. For example, according to the above-described method, a gap 1120 between first signal or channel transmission 1100 and second signal or channel transmission 1110 in FIG. 11 is guaranteed within a predetermined time or less, and/or a channel access procedure for the second signal or channel transmission may be performed in the gap 1120.

For a more specific example, a channel may be occupied by performing the channel access procedure type 2 of a base station, and a terminal may perform an uplink signal or channel transmission within the channel occupancy time. Here, if a gap in transmission between downlink signal or channel 1100 and uplink signal or channel 1110 of the terminal within the channel occupancy time is within a certain time (e.g., 16 µs), the terminal may perform the channel access procedure 1130 type 3 (or may not perform a separate channel access procedure) and may transmit an uplink signal or channel 1110. Here, the gap may be disposed in the first symbol that initiates transmission of the uplink signal or channel 1110 of the terminal.

When a gap between transmission of the downlink signal or channel 1100 and transmission of the uplink signal or channel 1110 of a terminal, within the channel occupancy time, is within a predetermined time (e.g., 25 µs), the terminal may perform the channel access procedure 1130 type 2 and transmit the uplink signal or channel 1110. Accordingly, the disclosure provides a method in which a base station and a terminal determines a channel access procedure, the starting position of uplink signal transmission, and the ending position of the uplink signal transmission by using at least one information of a channel access procedure performed for uplink signal transmission, the starting position of the uplink signal transmission, and the ending position of the uplink signal transmission.

The terminal may deliver, to the base station, capability information on supportable or performable uplink channel access procedure types. In this regard, the terminal may transmit, to the base station through the capability information, whether each of the uplink channel access procedure types can be performed or the channel access procedure types that can be performed by the terminal. If a certain type of uplink channel access procedure types are mandatorily supported by the terminal (mandatory), the terminal may deliver, to the base station through the capability information, whether the support for a specific uplink channel access procedure type is available.

Similarly, the terminal may deliver, to the base station, capability information on a transmission start position of supportable or transmittable uplink signal. In this case, the terminal may transmit, to the base station through the capacity information, whether each of the uplink signal transmission starting positions can be performed or information on an uplink signal transmission starting position that can be started for transmission by the terminal. If some starting positions of the uplink signal transmission starting positions are mandatorily supported by the terminal (mandatory), the terminal may deliver, to the base station through capability information, whether the uplink signal transmission can be started at a specific position.

Similarly, the terminal may deliver, to a base station, capability information on transmission ending position of a supportable or transmittable uplink signal. In this case, the terminal may transmit, to the base station through the capacity information, whether each of the uplink signal transmission ending positions can be performed or information on an uplink signal transmission ending position that can be terminated for transmission by the terminal. If some ending positions of the uplink signal transmission ending positions are mandatorily supported by the terminal (mandatory), the terminal may deliver, to the base station through capability information, whether the uplink signal transmission can be terminated at a specific position.

Hereinafter, description of the disclosure will be given on the assumption that at least one capability information on the uplink channel access procedure type that can be supported by a terminal, an uplink signal transmission starting position, and an uplink signal transmission ending position is transmitted to the base station, and the base station employs one or more uplink channel access procedure type, the uplink signal transmission starting position, and the uplink signal transmission ending position. However, the following disclosure may be applicable even when the terminal does not transmit the capability information on the uplink channel access procedure type that can be supported by the terminal, the uplink signal transmission starting position, and the uplink signal transmission ending position, to the base station.

Here, the capability may be independent according to a frequency band or a combination of frequency bands. For example, the capabilities may be defined on the channel access procedure type 1 and 2 in the 5 GHz frequency band and the channel access procedure type 1, 2, and 3 in the 6 GHz frequency band. In addition, the terminal may determine at least one of the uplink channel access procedure type, the uplink signal transmission starting position, and the uplink signal transmission ending position according to one of various methods or a combination thereof, which are proposed in the disclosure. In addition, the terminal may independently determine each of the uplink channel access procedure type, the uplink signal transmission starting position, and the uplink signal transmission ending position according to one or a combination of methods proposed in the disclosure.

Embodiment 1

Method 1: A Method for Independently Determining a Channel Access Procedure Type and an Uplink Signal Transmission Starting Position One or more uplink channel access procedure types performed during transmission of an uplink signal or channel may be defined in advance between a base station and a terminal. As another method, the terminal may receive a configuration via a higher layer signal from a base station on one or more uplink channel access procedure types performed during transmission of an uplink signal or channel Here, the previously defined and configured uplink channel access procedure type may be independent according to the unlicensed band frequency band. For example, the capabilities may be defined on the channel access procedure type 1 and 2 in the 5 GHz frequency band and the channel access procedure type 1, 2, and 3 in the 6 GHz frequency band.

The base station may instruct, through DCI, the terminal to perform at least one type of the defined or configured uplink channel access procedures when an uplink signal or channel is transmitted. In other words, the base station may indicate, to the terminal, the channel access procedure type to be performed when the terminal transmits an uplink signal or channel through an uplink channel access procedure type indicator field included in DCI that indicates or configures uplink signal or channel transmission via an unlicensed band. The terminal that has received the DCI may determine the channel access procedure type to be performed when transmitting an uplink signal or channel according to the value of the uplink channel access procedure type indicator field of the DCI. The size of an uplink channel access procedure type indicator field of the DCI or the number of bits may be previously defined between the base station and the terminal, or may be changed according to the number (N) of uplink channel access procedure types configured via a higher layer signal. That is, the size of the uplink channel access procedure type indicator field of the DCI or the number of bits is an integer equal to or greater than $\log_2$ (N).

Table 6 is only an example of an uplink channel access procedure type indicator field for the case in which N is 1 and 2, and is not limited thereto. Type 2-1 and type 2-2 are classified according to a fixed channel access procedure execution time, for example, the type 2-1 and the type 2-2 may be regarded as a channel access procedure which is performed for a fixed time of 25 μs and a fixed time of 16 μs, respectively.

TABLE 6

| Value | Type of channel access | Value | Type of channel access |
|---|---|---|---|
| 0 | Type 1 | 00 | Type 1 |
| 1 | Type 2 | 01 | Type 2-1 |
|  |  | 10 | Type 2-2 |
|  |  | 11 | Type 3 |

The uplink signal or channel transmission starting position may be previously defined between the base station and the terminal to one or more different positions. In another method, the terminal may receive a configuration by the base station through a higher layer signal on one or more uplink signal or channel transmission starting positions. Here, a part of the uplink signal or channel transmission starting position is previously defined between the base station and the terminal, and another part of the uplink signal or channel transmission starting position may be configured via a higher layer signal by the base station. The predefined or configured uplink signal or channel transmission starting position may be independent according to an unlicensed band frequency band.

For example, the position may be as column (a) of Table 7 in the case of the 5 GHz frequency band or column (b) of Table 7 or the column (c) of Table 7 in the 6 GHz frequency band. Here, symbol X refers to a transmission starting symbol of an uplink signal or channel indicated or determined by the terminal from the base station. For example, in the case of an uplink data channel, symbol X means a first symbol of the uplink data channel allocated through the time resource allocation information field of DCI (or UL grant) that schedules the uplink data channel.

TABLE 7

| (a) | | (b) | | (c) | |
|---|---|---|---|---|---|
| Value | Starting position | Value | Starting position | Value | Starting position |
| 00 | Symbol X | 00 | Symbol X | 000 | Symbol X |
| 01 | 25 μs in symbol X | 01 | 16 μs in symbol X | 001 | 16 μs in symbol X |
| 10 | (25 + TA)μs in symbol X | 10 | (16 + TA)μs in symbol X | 010 | (16 + TA)μs in symbol X |
| 11 | Symbol X + 1 or 16 μs or (16 + TA)μs in Symbol X or reserved | 11 | Symbol X + 1 or 25 μs or (25 + TA)μs in Symbol X or reserved | 011 | 25 μs in symbol X |
|  |  |  |  | 100 | (25 + TA)μs in symbol X |
|  |  |  |  | 101 | Symbol X + 1 or reserved |
|  |  |  |  | 110 | Reserved |
|  |  |  |  | 111 | Reserved |

The base station may instruct the terminal to initiate the uplink signal or channel transmission at least one of the defined or configured uplink signal or channel transmission starting position, through DCI. In other words, the base station may indicate the starting position of the uplink signal or channel transmission to the terminal through the uplink transmission starting position field included in the DCI that indicates or configures the uplink signal or channel transmission via the unlicensed band. The terminal that received the DCI may determine the starting position of the uplink signal or channel transmission according to the value of the uplink transmission starting position field of the DCI. Here, the size of the uplink transmission starting position field of the DCI or the number of bits may be defined in advance between the base station and the terminal, or may be changed according to the number of positions (N1) at which uplink transmission configured via an upper signal can be started. That is, the size of the uplink transmission starting position field of the DCI or the number of bits in is an integer equal to or greater than log 2 (N1). Table 7 is only an example of the uplink transmission position field for various N1s and is not limited thereto.

Method 2: A Method for Simultaneously Determining a Channel Access Procedure Type and an Uplink Signal Transmission Starting Position Another method for determining the starting position of the uplink signal or channel transmission according to the channel access procedure indicated or determined to be performed by a terminal when the uplink signal or channel is transmitted is a method in which the channel access procedure type and the uplink transmission starting position are determined through the value of one field in DCI, as shown in Table 8.

TABLE 8

| Value | Channel access procedure type | starting position |
|---|---|---|
| 000 | Type 1 | Symbol X |
| 001 | Type 2-1 | 25 µs in symbol X |
| 010 | Type 2-1 | (25 + TA)µs in symbol X |
| 011 | Type 2-2 | 16 µs in symbol X |
| 100 | Type 2-2 | (16 + TA)µs in symbol X |
| 101 | Type 3 | Symbol X |
| 110 | Type 3 | 16 µs in symbol X |
| 111 | Type 3 | (16 + TA)µs in symbol X |

As in Method 2, the number of bits required to transmit the information may be minimized by allowing the channel access procedure type and the uplink signal or channel transmission starting position to be indicated or determined through one field of the DCI received by the terminal.

Method 3: A Method for Determining a Starting Position of Uplink Signal Transmission According to the Indicated or Determined Channel Access Procedure Types The terminal may determine the starting position of the uplink signal or channel transmission according to the channel access procedure indicated or determined to be performed when the uplink signal or channel is transmitted. For example, description will be given on the case in which the channel access procedure type indicated or determined to be performed by the terminal when the uplink signal or channel is transmitted is the type 3 and type 2-2. In this case, the terminal may determine the starting position of the uplink signal or channel transmission according to the gap or the channel access procedure execution time required in the channel access procedure type indicated or determined to be performed when the uplink signal or channel is transmitted.

For example, when the terminal is instructed to perform the channel access procedure type 3 or 2-2, the terminal needs a gap of 16 µs or a channel access procedure execution time corresponding thereto in order to perform the channel access procedure. Therefore, the uplink transmission starting position may be a gap of 16 µs or a position of 16 µs in symbol X or a position of (16+TA) µs in symbol X. Similarly, when the terminal is instructed to perform the channel access procedure type 2-1, the terminal needs a gap of 25 µs or a channel access procedure execution time corresponding thereto in order to perform the channel access procedure. Therefore, the uplink transmission starting position may be a gap of 25 µs or a position of 25 µs in symbol X or a position of (25+TA) µs in symbol X.

In other words, when the channel access procedure type 3 or 2-2 is indicated to the terminal, the terminal may determine the uplink transmission starting field, based on (b) of Table 7, and when the channel access procedure type 2-1 is indicated to the terminal, the terminal may determine the uplink transmission starting position by determining the uplink transmission starting position field, based on column (a) of Table 7. Table 9 is a more generalized table, and column (a) and (b) of Table 7 or Table 9 are only examples, and the uplink transmission starting position is not limited thereto.

TABLE 9

| Value | Starting position |
|---|---|
| 00 | Symbol X |
| 01 | Z µs in symbol X |
| 10 | (Z + TA)µs in symbol X |
| 11 | Symbol X + 1 or reserved |

Note
Z = 25 at least for channel access type 2-2 or type 3
Z = 16 at least for channel access procedure type 2-1

As described above, the starting position of the uplink signal or channel transmission is determined according to the channel access procedure indicated or determined to be performed by the terminal when the uplink signal or channel is transmitted, to exclude unnecessary starting positions as shown in column (a) of Table 7, thereby minimizing the size of the uplink transmission starting field of DCI.

Method 4: A Method in which a Channel Access Procedure Type is Determined According to the Indicated or Determined Starting Position of Uplink Signal Transmission The terminal may determine a channel access procedure type to be performed when the uplink signal or channel is transmitted, according to a transmission starting position of the uplink signal or channel indicated or determined through DCI or the higher layer signal. Here, the channel access procedure type information may be information instructing or configuring that the terminal needs to perform a channel access procedure for uplink signal or channel transmission or do not need to perform a channel access procedure, and when the channel access procedure is indicated or configured to be performed, the terminal may determine the channel access procedure type that the terminal performs, according to a transmission starting position of an uplink signal or channel.

For example, in the case where value 00, which is one of the uplink transmission starting positions in Table 10, is indicated or configured to the terminal, when the terminal is instructed to perform a channel access procedure (value 0), the terminal may determine to perform the channel access procedure type 1. When the terminal is instructed that it is not necessary to perform a channel access procedure (value 1), the terminal may determine to perform the channel access procedure type 3.

For another example, in the case where value 01, which is one of the uplink transmission starting positions in Table 10, is indicated or configured to the terminal, when the terminal is instructed to perform a channel access procedure (value 0), the terminal may determine to perform the channel access procedure type 2-2. When the terminal is instructed that it is not necessary to perform a channel access procedure (value 1), the terminal may determine to perform the channel access procedure type 3.

For another example, in the case where value 10, which is one of the uplink transmission starting positions in Table 10, is indicated or configured to the terminal, when the terminal is instructed to perform a channel access procedure (value 0), the terminal may determine to perform the channel access procedure type 2-1. When the terminal is instructed that it is not necessary to perform a channel access procedure (value 1), the terminal may determine that the case is an error and may not perform an uplink signal or channel transmission. Here, the terminal may perform the channel access procedure type 1.

For another example, in the case where value 11, which is one of the uplink transmission starting positions in Table 10, is indicated or configured to the terminal, when the terminal is instructed to perform a channel access procedure (value 0), if the starting position is (25+TA) µs, the terminal may determine to perform the channel access procedure type 2-1, and if the starting position is (16+TA) µs, the terminal may determine to perform the channel access procedure type 2-2. If the terminal is instructed that it is not necessary to perform a channel access procedure (value 1) in the case where the start position is (25+TA) µs, the terminal may determine that the case is an error and may not perform uplink signal or channel transmission. Here, the terminal may perform the channel access procedure type 1.

TABLE 10

| Value | starting position | Value | Type of channel access procedure |
|---|---|---|---|
| 00 | Symbol X | 0 | Type 1 or Type 2-1 or Type 2-2 |
| 01 | 16 µs in symbol X | 1 | Type 3 |
| 10 | 25 µs in symbol X | | |
| 11 | (25 + TA)µs in symbol X or | | |

In various methods proposed in the disclosure, a transmission starting position of an uplink signal or channel may be defined or configured differently according to a TA value of the terminal. For example, when the TA value of the terminal is 0, it is not necessary to indicate or configure (25+TA) µs of symbol X or (16+TA) µs of symbol X, which is one of the transmission starting positions of the uplink signal or channel, the positions may not need to be included in the transmission starting position field of an uplink signal or channel, thereby minimizing unnecessary bits in the position field. In the above case as an example, the transmission starting position field of the uplink signal or channel may be configured as shown in Table 11, and the size of the transmission starting position field of the uplink signal or channel may be significantly reduced by excluding the starting position in which TA is taken into account as described above.

TABLE 11

| Value | starting position | Value | starting position |
|---|---|---|---|
| 00 | Symbol X | 0 | Symbol X |
| 01 | 16 µs in symbol X | 1 | 16 µs or 25 µs in symbol X |
| 10 | 25 µs in symbol X | | |
| 11 | Symbol X + 1 or reserved | | |

Embodiment 2

Proposed in the embodiment is a method for determining an uplink channel access procedure type to be performed by a terminal in order to transmit an uplink signal or channel, according to whether the uplink signal or channel of the terminal is transmitted within the channel occupancy time (COT) of a base station or transmitted outside the channel occupancy time (COT) of the base station.

In the case where the base station performs the channel access procedure type 1, and the unlicensed band is determined as in an idle state, the base station may occupy or access the unlicensed band to use the same. Here, the base station may occupy and use the unlicensed band for a time of $T_{mcot,p}$ or less in Table 2. Meanwhile, the base station may instruct, or configure (or schedule) such that a terminal transmit an uplink signal or channel within the channel occupancy time of the base station. If the uplink signal or channel of the terminal is transmitted within the channel occupancy time of the base station, for example, all the uplink signal or channel are transmitted within the channel occupancy time of the base station from the transmission starting point to the transmission ending point thereof, the terminal may perform the channel access procedure type 2 or 3 and transmit the uplink signal or channel Even if the terminal is instructed or receive a configuration by the base station to perform the channel access procedure type 1 and transmit an uplink signal or channel, the terminal may perform the channel access procedure type 2 or 3 and transmit the uplink signal or channel.

Accordingly, the terminal may determine a channel access procedure type without a separate uplink channel access procedure type indicator, or according to whether or not the 1-bit uplink channel access procedure type indicator and the uplink signal or channel are transmitted within the channel occupancy time of the base station. Additionally, the terminal may determine a channel access procedure type according to the starting position of an uplink signal or channel indicated or set by the base station.

For example, the base station may instruct, through DCI, the terminal to initiate the uplink signal or channel transmission at least one of the above defined or configured uplink signal or channel transmission starting positions. In other words, the base station may indicate the starting position of the uplink signal or channel transmission to the terminal through the uplink transmission starting position field included in the DCI indicating or configuring the uplink signal or channel transmission via the unlicensed band. The terminal that received the DCI may determine the starting position of the uplink signal or channel transmission according to the value of the uplink transmission starting position field of the DCI. Here, the size of the uplink transmission starting position field of the DCI or the number of bits may be defined in advance between the base station and the terminal, or may be changed according to the number of positions (N1) at which uplink transmission configured via a higher layer signal can be started. That is, the size of the uplink transmission starting position field of the DCI or the number of bits is an integer equal to or greater than $\log_2$ (N1). Table 7 is only an example of the uplink transmission position field for various N1s and is not limited thereto.

If the uplink signal or channel of the terminal is transmitted within the channel occupancy time of the base station, the terminal may transmit the uplink signal or channel after performing the channel access procedure type 2 or 3. In addition, the terminal may determine a more specific or clear channel access procedure type according to a position indicated or configured through an uplink transmission position field.

For example, if the uplink signal or channel of the terminal is transmitted or scheduled within the channel occupancy time of the base station in the terminal predefined or configured to use only the channel access procedure type 1 and 2-1, the terminal may transmit the uplink signal or channel after the channel access procedure type 2-1. If the uplink signal or channel of the terminal is transmitted or scheduled outside the channel occupancy time of the base station, the terminal may transmit the uplink signal or channel after the channel access procedure type 1.

For another example, if the uplink signal or channel of the terminal is transmitted or scheduled within the channel occupancy time of the base station in the terminal predefined or configured to use only the channel access procedure type 1, 2-1, and 2-2, the terminal may transmit the uplink signal or channel after the channel access procedure type 2-1 or 2-2. Here, the specific channel access procedure may be different depending on the transmission starting position of the uplink signal or channel indicated or configured to the terminal.

For example, in the case where the uplink signal or channel of the terminal is transmitted within the channel occupancy time of the base station, and the uplink transmission starting position is after 16 µs or (16+TA) µs of symbol X, the terminal determines to perform the channel access procedure type 2-2 and may transmit the uplink signal or channel after performing the channel access procedure type 2-2. In the case where the uplink signal or channel of the terminal is transmitted within the channel occupancy time of the base station, and the uplink transmission starting position is after 25 µs or (25+TA) µs of the symbol X, the terminal determines to perform the channel access procedure 2-1 and may transmit the uplink signal or channel after performing the channel access procedure type 2-1. In the case where the uplink signal or channel of the terminal is transmitted or scheduled outside the channel occupancy time of the base station, the terminal may transmit the uplink signal or channel after the channel access procedure type 1.

For another example, if the uplink signal or channel of a terminal is transmitted or scheduled within a channel occupancy time of the base station, in the terminal that is predefined or configured to use only the channel access procedure type 1, 2-1, and 3, the terminal may transmit the uplink signal or channel after the channel access procedure type 2-1 or 3. Here, the specific channel access procedure may be different depending on the transmission starting position of the uplink signal or channel indicated or configured to the terminal.

For example, in the case where the uplink signal or channel of the terminal is transmitted within the channel occupancy time of the base station, and the uplink transmission starting position is after 16 µs or (16+TA) µs of symbol X, the terminal determines to perform the channel access procedure type 3 and may transmit the uplink signal or channel after performing the channel access procedure type 3. In the case where the uplink signal or channel of the terminal is transmitted within the channel occupancy time of the base station, and the uplink transmission starting position is after 25 µs or (25+TA) µs of symbol X, the terminal determines to perform the channel access procedure type 2-1 and may transmit the uplink signal or channel after performing the channel access procedure type 2-1. In the case where the uplink signal or channel of the terminal is transmitted or scheduled outside the channel occupancy time of the base station, the terminal may transmit the uplink signal or channel after the channel access procedure type 1.

For another example, in the case where the uplink signal or channel of a terminal is transmitted or scheduled within the channel occupancy time of the base station, in the terminal that is predefined or configured to use only the channel access procedure type 1, 2-2, and 3, the terminal may transmit an uplink signal or channel after the channel access procedure 2-2 or 3. Here, a specific channel access procedure may be different depending on the transmission starting position of an uplink signal or channel and the channel access procedure type indicator or a channel access procedure execution/non-execution indicator, which are indicated or configured to the terminal.

For example, in the case where the uplink signal or channel of the terminal is transmitted within the channel occupancy time of the base station and the uplink transmission starting position is after 16 µs or (16+TA) µs of symbol X, when the channel access procedure type indicator or the channel access procedure execution/non-execution indicator indicates or configures to perform the channel access procedure, the terminal determines to perform the channel access procedure type 2-2, and may transmit the uplink signal or channel after performing the channel access procedure type 2-2. In the case where the uplink signal or channel of the terminal is transmitted within the channel occupancy time of the base station, and the uplink transmission starting position is after 16 µs or (16+TA) µs of symbol X, when the channel access procedure type indicator or the channel access procedure execution/non-execution indicator indicates or configures not to perform the channel access procedure, the terminal determines to perform the channel access procedure type 3, and may transmit the uplink signal or channel after performing the channel access procedure type 3. If the uplink signal or channel of the terminal is transmitted or scheduled outside the channel occupancy time of the base station, the terminal may transmit the uplink signal or channel after the channel access procedure type 1.

For another example, in the case where the uplink signal or channel of a terminal is transmitted or scheduled within the channel occupancy time of the base station, in the terminal that is predefined or configured to use only the channel access procedure type 1, 2-1, 2-2, and 3, the terminal may transmit an uplink signal or channel after the channel access procedure 2-1, 2-2, and 3. Here, the specific channel access procedure may be different depending on the transmission starting position of an uplink signal or channel and a channel access procedure type indicator or a channel access procedure execution/non-execution indicator indicated or configured to the terminal.

In the case where the uplink signal or channel of the terminal is transmitted within the channel occupancy time of the base station, and the uplink transmission starting position is after 16 µs or (16+TA) µs of symbol X, when the channel access procedure type indicator or the channel access procedure execution/non-execution indicator indicates or configures to perform the channel access procedure, the terminal determines to perform the channel access procedure type 2-2, and may transmit the uplink signal or channel after performing the channel access procedure type 2-2. In the case where the uplink signal or channel of the terminal is transmitted within the channel occupancy time of the base station, and the uplink transmission starting position is after 16 μs or (16+TA) μs of symbol X, when the channel access procedure type indicator or the channel access procedure execution/non-execution indicator indicates or configures not to perform the channel access procedure, the terminal determines to perform the channel access procedure type 3, and may transmit the uplink signal or channel after performing the channel access procedure type 3.

In the case where the uplink signal or channel of the terminal is transmitted within the channel occupancy time of the base station, and the uplink transmission starting position is after 25 μs or (25+TA) μs of symbol X, when the channel access procedure type indicator or the channel access procedure execution/non-execution indicator indicates or configures to perform the channel access procedure, the terminal determines to perform the channel access procedure type 2-1, and may transmit the uplink signal or channel after performing the channel access procedure type 2-1. In the case where the uplink signal or channel of the terminal is transmitted within the channel occupancy time of the base station, and the uplink transmission starting position is after 25 μs or (25+TA) μs of symbol X, when the channel access procedure type indicator or the channel access procedure execution/non-execution indicator indicates or configures not to perform the channel access procedure, the terminal determines that at least one of the channel access procedure execution/non-execution indicator or the uplink transmission starting position indicator is wrong and may not perform the uplink transmission. If the uplink signal or channel of the terminal is transmitted or scheduled outside the channel occupancy time of the base station, the terminal may transmit the uplink signal or channel after the channel access procedure type 1.

Embodiment 3

Proposed in the embodiment is a method for determining a transmission starting position of an uplink signal or channel according to a subcarrier spacing (Δf=2μ*15 kHz) of an uplink signal or channel of a terminal. In a typical NR system, a subcarrier spacing may be configured for each bandwidth part, and the uplink signal or channel transmitted in the configured bandwidth part transmits an uplink signal or channel according to the subcarrier spacing configured in the bandwidth part. Here, symbols have different lengths according to the subcarrier spacing, which are, for example, as shown in Table 12.

TABLE 12

| μ | Δf = 2μ · 15 kHz | Symbol length (useful symbol) | Symbol length (CP) |
|---|---|---|---|
| 0 | 15 | 66.67 μs | 4.69 μs |
| 1 | 30 | 33.33 μs | 2.34 μs |
| 2 | 60 | 16.67 μs | 1.17 μs |
| 3 | 120 | 8.33 μs | 586 ns |
| 4 | 240 | 4.17 μs | 293 ns |

An OFDM signal (sl(p, u)) of a signal or channel except PRACH may be generated in the NR system as follows, $$s_l^{(p,\mu)}(t) = \sum_{k=0}^{N_{grid}^{size,\mu} N_{sc}^{RB}-1} a_{k,l}^{(p,\mu)} \cdot e^{j2\pi\left(k+k_0^{\mu}-N_{grid}^{size,\mu} N_{sc}^{RB}/2\right)\Delta f\left(t-N_{CP,l}^{\mu} T_c - t_{start,l}^{\mu}\right)}$$

where $t_{start,l}^{\mu} \le t <$ $t_{start,l}^{\mu} + (N_u^{\mu} + N_{CP,l}^{\mu})T_c$ is the time within the subframe, $N_u^{\mu} = 2048\kappa \cdot 2^{-\mu}$ $N_{CP,l}^{\mu} = \begin{cases} 512\kappa \cdot 2^{-\mu} & \text{extended cyclic prefix} \\ 144\kappa \cdot 2^{-\mu} + 16\kappa & \text{normal cyclic prefix, } l = 0 \text{ or } l = 7 \cdot 2^{\mu} \\ 144\kappa \cdot 2^{-\mu} & \text{normal cyclic prefix, } l \ne 0 \text{ and } l \ne 7 \cdot 2^{\mu} \end{cases}$ wherein Δf, μ denotes a value indicating a subcarrier spacing as shown in Table 11, and μ denotes the largest value μ among values μ configured to the terminal via a higher layer signal.

For convenience of description, the length of a symbol for a subcarrier spacing μ is marked as T μ and T μ'. Here, T μ' denotes the length of a symbol that is 16k·Tc longer than T μ among symbol lengths in a slot, wherein k is 64.

Figure 12:
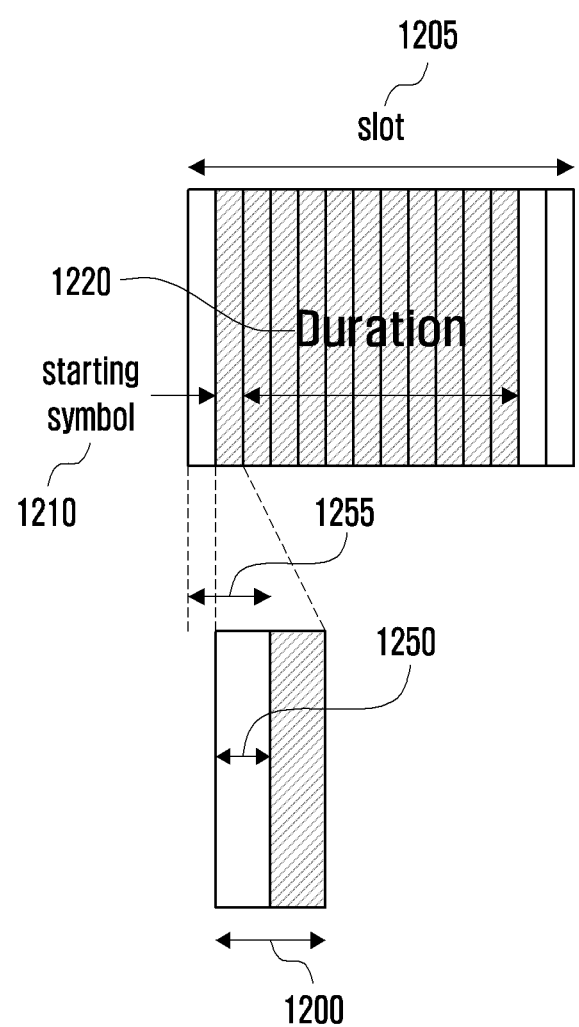
FIG. 12 illustrates another method for determining a time resource allocation region and a channel access procedure type in a wireless communication system according to an embodiment of the disclosure.

There may be a case where transmission starting positions, 16 μs, (16+TA) μs, 25 μs, and (25+TA) μs of the uplink signals or channels illustrated in the embodiments are not present in the symbol X depending on a subcarrier spacing. For example, in the case where the subcarrier spacing is 60 kHz subcarrier spacing, the length 1200 of a symbol is longer than 16 μs, but may be shorter than 25 μs, as shown in FIG. 12. In this case, (16+TA) μs may also have length shorter than the length 1200 of one symbol depending on the size of TA.

FIG. 12 illustrates another method for determining a time resource allocation region and a channel access procedure type in a wireless communication system according to an embodiment of the disclosure.

For example in FIG. 12, description will be given on the case in which time resource region for an uplink signal or channel is allocated such that transmission of the uplink signal or channel starts in a second symbol 1210 of a slot 1205 and continues for time or in symbols as long as the duration 1220. In this case, if the base station is to configure an uplink signal or channel transmission starting position after 25 μs position, with reference to the starting position of the slot 1205, the position needs to be a position after the 25 μs position in the first symbol for the 15 kHz or 30 kHz subcarrier spacing with reference to the slot starting position, but the position needs to be (25−Tμ) position at the second symbol of the slot 1205 for the 60 kHz subcarrier spacing. Therefore, a method by which a terminal correctly determines a transmission starting position of an uplink signal or channel is required in a system that supports various subcarrier spacings. For example, in a case where the length of a symbol for 60 kHz subcarrier spacing is expressed by T μ, the transmission starting position 1250 of an uplink signal or channel expressed based on symbol X is as shown in Table 13. The transmission starting position 1250 may be expressed as a position 1255, with reference to a first symbol of the slot.

TABLE 13

| Value | Starting position (15 kHz, 30 kHz SCS) | Starting position (60 kHz SCS) |
|---|---|---|
| 00 | 16 μs in symbol X | 16 μs in symbol X |
| 01 | (16 + TA)μs in symbol X | (16 + TA)μs in symbol X, if (16 + TA)μs <= Tμ |

TABLE 13-continued

| Value | Starting position (15 kHz, 30 kHz SCS) | Starting position (60 kHz SCS) |
|---|---|---|
| | | (16 + TA − Tμ)μs in symbol X + 1, if (16 + TA)μs <= 2 · Tμ (16 + TA − 2 · Tμ)μs in symbol X + 2, if (16 + TA)μs <= 3 · Tμ ... |
| 10 | 25 μs in symbol X | (25 − Tμ)μs in symbol X + 1 |
| 11 | (25 + TA)μs in symbol X | (25 + TA − Tμ)μs in symbol X + 1, if (25 + TA)μs <= 2 · Tμ (25 + TA − 2 · Tμ)μs in symbol X + 2, if (25 + TA)μs <= 3 · Tμ (25 + TA − 3 · Tμ)μs in symbol X + 3, if (25 + TA)μs <= 4 · Tμ ... |

Hereinafter, in the embodiments disclosed herein, description has been given on the assumption that a terminal which has received one DCI transmits one uplink signal or channel corresponding thereto in one slot, but is applicable to the case where the terminal receiving one DCI transmits a plurality of uplink signals or channels corresponding thereto in a plurality of slots. In the embodiments for example, the method for determining a starting position of an uplink signal or channel transmission is applicable to a first slot in which an uplink signal or channel transmission is configured or scheduled through the DCI. Similarly, the method for determining an uplink channel access procedure type in the embodiments may refer to a channel access procedure when the uplink signal or channel is transmitted in the first slot in which uplink signal or channel transmission is configured or scheduled through the DCI. Here, the determined uplink channel access procedure type may be applied even after the first slot or after the first uplink signal or channel transmission starting position, according to the result of the channel access procedure.

Figure 13:
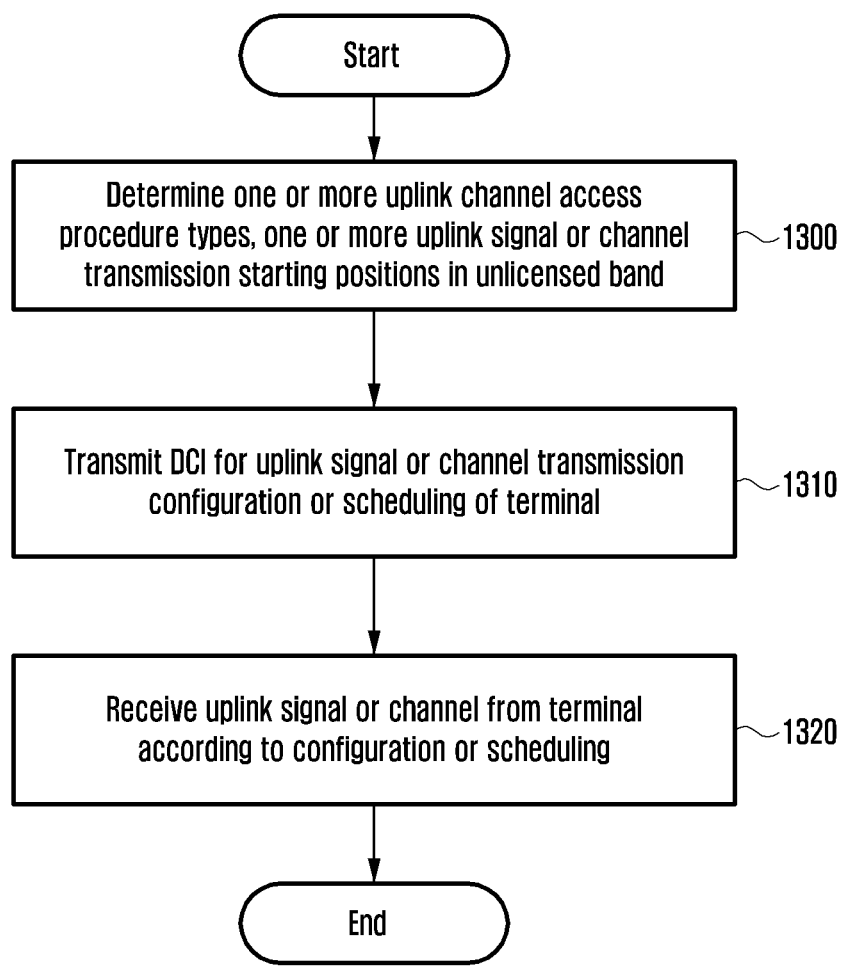
FIG. 13 is a flowchart of a base station for determining a time resource allocation region and a channel access procedure type in a wireless communication system according to an embodiment of the disclosure.

FIG. 13 is a flowchart of a base station for determining an uplink channel access procedure type and an uplink signal or channel transmission starting position in a wireless communication system according to an embodiment of the disclosure. The base station 110 in FIG. 1 is an example of the base station in the above description.

Referring to FIG. 13, a base station determines one or more uplink channel access procedure types, one or more uplink signal or channel transmission starting positions, and the like, which may be used by a terminal in an unlicensed band cell according to capability information of the terminal, and may configure the same to the terminal (operation 1300). Here, one or more uplink channel access procedure types and one and more uplink signal or channel transmission starting positions, which may be used by the terminal in the unlicensed band cell without the capability information of the terminal, may also be defined in advance. In addition, the information including the uplink channel access procedure types and the uplink signal or channel starting positions may be independent according to an unlicensed band frequency, country, or regulation for each region.

The base station transmits the DCI for configuring or scheduling an uplink signal or channel transmission of the terminal to the terminal (operation 1310). Subsequently, the base station may receive the uplink signal or channel transmitted from the terminal at the configured or scheduled position (operation 1320).

Figure 14:
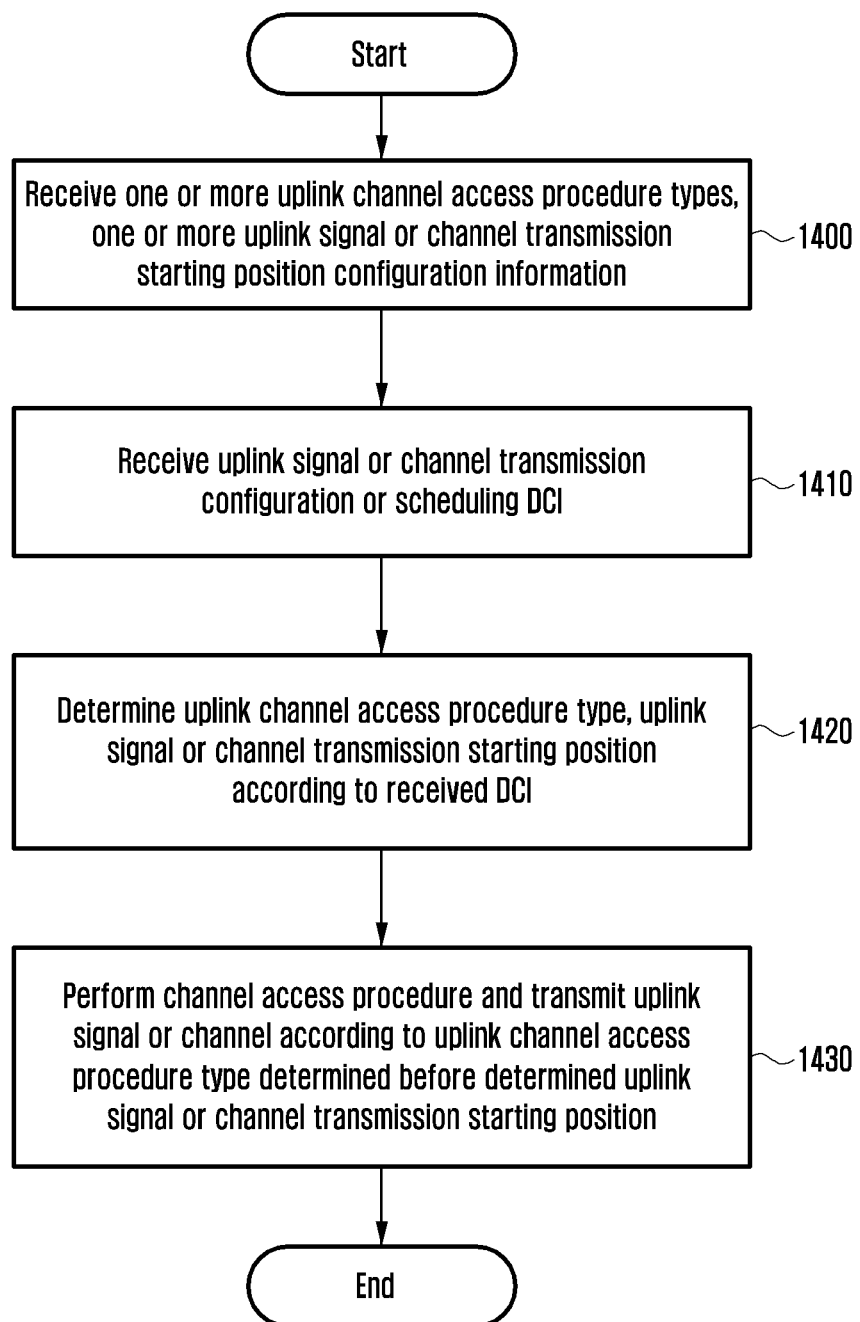
FIG. 14 is a flowchart of a terminal for determining a time resource allocation region and a channel access procedure type in a wireless communication system according to an embodiment of the disclosure.

FIG. 14 is a flowchart of a terminal for determining an uplink channel access procedure type and an uplink signal or channel transmission starting position in a wireless communication system according to an embodiment of the disclosure. The terminal 120 or 130 in FIG. 1 is an example of the terminal in the above description.

Referring to FIG. 14, a terminal may transmit, to a base station, capability information including one or more uplink channel access procedure types and one or more uplink signal or channel transmission starting positions, which may be used by the terminal in an unlicensed band cell (operation 1400 or operation prior thereto). One or more uplink channel access procedure types and one or more uplink signal or channel transmission starting positions, which may be used by the terminal in the unlicensed band cell without transmitting capability information including the information, may also be defined in advance. In addition, the information including the uplink channel access procedure types and the uplink signal or channel starting positions may be independent according to an unlicensed band frequency, country, or regulation for each region.

The terminal may receive a configuration on information of one or more uplink channel access procedure types and one or more uplink signal or channel transmission starting positions in respect to uplink signal or channel transmission from the base station (operation 1400) and may determine an uplink channel access procedure type indicator field and the size of an uplink signal or channel transmission starting position indicator field through operation 1400.

The terminal receives DCI for configuring or scheduling uplink signal or channel transmission (operation 1410). The terminal may determine an uplink channel access procedure type and an uplink signal or channel transmission starting position for the configured or scheduled uplink signal or channel transmission through the various embodiments and methods in the disclosure by using at least one of the uplink channel access procedure type and the uplink signal or channel transmission starting position information, which are indicated in the received DCI, additionally whether or not the uplink signal or channel is transmitted within a channel occupancy time of the base station, additionally, a subcarrier spacing, and the like (operation 1420). The terminal may perform the channel access procedure according to the uplink channel access procedure type determined before the uplink signal or channel transmission starting position determined in operation 1420, and may transmit the uplink signal or channel according to the result of the channel access procedure (operation 1430).

In the disclosure, the expressions "equal to or greater than" or "equal to or less than" may be used to determine whether a certain condition (or criterion) is fulfilled. However, this is only a description for expressing an example, and does not exclude the cases of "exceeding" or "less than". In relation to described conditions, "equal to or greater than", "less than or equal to", and "equal to or greater than and less than" may be replaced by "exceeding", "less than", and "exceeding and less than or equal to", respectively.

Methods disclosed in the claims and/or methods according to various embodiments described in the specification of the disclosure may be implemented by hardware, software, or a combination of hardware and software.

When the methods are implemented by software, a non-transitory computer-readable storage medium for storing one or more programs (software modules) may be provided. The one or more programs stored in the non-transitory computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical spirit of the disclosure.

Further, the above respective embodiments may be employed in combination, as necessary. For example, the embodiments of the disclosure may be entirely or partially combined to operate a base station and a terminal.

Further, although the above embodiments have been described by way of the 5G and NR systems, other variants based on the technical idea of the embodiments may be implemented in other systems such as the LTE, LTE-A, and LTE-A-Pro systems.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving, from a base station, information on a plurality of channel access types for an uplink channel via a radio resource control (RRC) signaling;
   receiving, from the base station, downlink control information (DCI) scheduling the uplink channel, wherein the DCI includes a first field indicating a combination of a channel access type and information associated with a starting position of the uplink channel in a symbol;
   performing a channel access procedure based on the channel access type indicated by the first field; and
   transmitting, to the base station, the uplink channel starting from the starting position,
   wherein a number of bits of the first field is determined based on a number of the plurality of channel access types configured via the RRC signaling.

2. The method of claim 1,
   wherein the DCI further includes a second field indicating time domain resource allocation for the uplink channel, and
   wherein the starting position of the uplink channel is identified based on a time gap corresponding to the information indicated by the first field and a first symbol among symbols for the uplink channel allocated by the second field.

3. The method of claim 2, wherein the time gap is one of 0, 25 us, 16 us plus timing advance (TA), or 25 us plus TA.

4. The method of claim 2,
   wherein the starting position of the uplink channel is identified further based on a subcarrier spacing, and
   wherein the uplink channel is a physical uplink control channel (PUCCH) or a physical uplink shared channel (PUSCH).

5. The method of claim 1, further comprising:
   transmitting, to the base station, capability information for at least one channel access type supported by the terminal.

6. A method performed by a base station in a wireless communication system, the method comprising:
   transmitting, to a terminal, information on a plurality of channel access types for an uplink channel via a radio resource control (RRC) signaling;
   transmitting, to the terminal, downlink control information (DCI) scheduling the uplink channel, wherein the DCI includes a first field indicating a combination of a channel access type and information associated with a starting position of the uplink channel in a symbol; and
   receiving, from the terminal, the uplink channel starting from the starting position,
   wherein the uplink channel is received based on a channel access procedure of the channel access type indicated by the first field, and
   wherein a number of bits of the first field is determined based on a number of the plurality of channel access types configured via the RRC signaling.

7. The method of claim 6,
   wherein the DCI further includes a second field indicating time domain resource allocation for the uplink channel, and
   wherein the starting position of the uplink channel is identified based on a time gap corresponding to the information indicated by the first field and a first symbol among symbols for the uplink channel allocated by the second field.

8. The method of claim 7, wherein the time gap is one of 0, 25 us, 16 us plus timing advance (TA), or 25 us plus TA.

9. The method of claim 7,
   wherein the starting position of the uplink channel is identified further based on a subcarrier spacing, and
   wherein the uplink channel is a physical uplink control channel (PUCCH) or a physical uplink shared channel (PUSCH).

10. The method of claim 6, further comprising:
    receiving, from the terminal, capability information for at least one channel access type supported by the terminal.

11. A terminal in a wireless communication system, the terminal comprising:
a transceiver configured to transmit or receive a signal; and
a controller configured to:
receive, from a base station, information on a plurality of channel access types for an uplink channel via a radio resource control (RRC) signaling,
receive, from the base station, downlink control information (DCI) scheduling the uplink channel, wherein the DCI includes a first field indicating a combination of a channel access type and information associated with a starting position of the uplink signal in a symbol,
perform a channel access procedure based on the channel access type indicated by the first field, and
transmit, to the base station, the uplink channel starting from the starting position,
wherein a number of bits of the first field is determined based on a number of the plurality of channel access types configured via the RRC signaling.

12. The terminal of claim 11,
wherein the DCI further includes a second field indicating time domain resource allocation for the uplink channel, and
wherein the starting position of the uplink channel is identified based on a time gap corresponding to the information indicated by the first field and a first symbol among symbols for the uplink channel allocated by the second field.

13. The terminal of claim 12, wherein the time gap is one of 0, 25 us, 16 us plus timing advance (TA), or 25 us plus TA.

14. The terminal of claim 12,
wherein the starting position of the uplink channel is identified further based on a subcarrier spacing, and
wherein the uplink channel is a physical uplink control channel (PUCCH) or a physical uplink shared channel (PUSCH).

15. The terminal of claim 11, wherein the controller is further configured to:
transmit, to the base station, capability information for at least one channel access type supported by the terminal.

16. A base station in a wireless communication system, the base station comprising:
a transceiver configured to transmit or receive a signal; and
a controller configured to:
transmit, to a terminal, information on a plurality of channel access types for an uplink channel via a radio resource control (RRC) signaling,
transmit, to the terminal, downlink control information (DCI) scheduling the uplink channel, wherein the DCI includes a first field indicating a combination of a channel access type and information associated with a starting position of the uplink channel in a symbol, and
receive, from the terminal, the uplink channel starting from the starting position,
wherein the uplink channel is received based on a channel access procedure of the channel access type indicated by the first field, and
wherein a number of bits of the first field is determined based on a number of the plurality of channel access types configured via the RRC signaling.

17. The base station of claim 16,
wherein the DCI further includes a second field indicating time domain resource allocation for the uplink channel, and
wherein the starting position of the uplink channel is identified based on a time gap corresponding to the information indicated by the first field and a first symbol among symbols for the uplink channel allocated by the second field.

18. The base station of claim 17, wherein the time gap is one of 0, 25 us, 16 us plus timing advance (TA), or 25 us plus TA.

19. The base station of claim 17,
wherein the starting position of the uplink channel is identified further based on a subcarrier spacing, and
wherein the uplink channel is a physical uplink control channel (PUCCH) or a physical uplink shared channel (PUSCH).

20. The base station of claim 16, wherein the controller is further configured to:
receive, from the terminal, capability information for at least one channel access type supported by the terminal.

* * * * *